(12) United States Patent
Shaw et al.

(10) Patent No.: US 11,475,599 B2
(45) Date of Patent: Oct. 18, 2022

(54) SYSTEMS AND METHODS FOR MEASUREMENT OF 3D ATTRIBUTES USING COMPUTER VISION

(71) Applicant: KARSTEN MANUFACTURING CORPORATION, Phoenix, AZ (US)

(72) Inventors: Tyler A. Shaw, Paradise Valley, AZ (US); Clayson C. Spackman, Scottsdale, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 151 days.

(21) Appl. No.: 16/439,550

(22) Filed: Jun. 12, 2019

(65) Prior Publication Data

US 2019/0378303 A1    Dec. 12, 2019

Related U.S. Application Data

(60) Provisional application No. 62/684,119, filed on Jun. 12, 2018.

(51) Int. Cl.
*G06K 9/00* (2022.01)
*G06T 7/00* (2017.01)
(Continued)

(52) U.S. Cl.
CPC .............. *G06T 7/97* (2017.01); *A63B 53/047* (2013.01); *A63B 60/46* (2015.10); *A63B 69/36* (2013.01);
(Continued)

(58) Field of Classification Search
CPC ........... G06T 7/20; G06T 7/246; G06T 7/248; G06T 7/277; G06T 7/285; G06T 7/292;
(Continued)

(56) References Cited

U.S. PATENT DOCUMENTS 6,482,101 B1    11/2002  Posma
6,506,124 B1 *   1/2003  Manwaring ............ A63B 69/36
                                                       473/198
(Continued)

FOREIGN PATENT DOCUMENTS

JP    H09101125      4/1997
JP    H10337344     12/1998
(Continued)

OTHER PUBLICATIONS

Jun Park, Suya You, and Ulrich Neumann, "Extending augmented reality with natural feature tracking", Proc. SPIE 3524, Telemanipulator and Telepresence Technologies V, (Dec. 18, 1998); https://doi.org/10.1117/12.333674.

*Primary Examiner* — Eric Rush

(57) ABSTRACT

A system including a computing device and camera is disclosed; the system configured for measuring three-dimensional attributes and associated performance measurements of a mechanical device. Some embodiments comprise a camera configured to capture images of the mechanical device and a computing device in communication with the camera. In some embodiments, the computing device is configured to access a first set of pixels associated with a first plurality of fiducials to calibrate a spatial resolution of the camera. A second image from the camera can be converted into a second set of pixels associated with each of the plurality of fiducials, which are attached to the mechanical device. The computing device can be further configured to compare the first and second set of pixels to determine the location of the plurality of fiducials on the mechanical device.

19 Claims, 13 Drawing Sheets

(51) Int. Cl.
*G06T 7/80* (2017.01)
*G06T 7/73* (2017.01)
*A63B 69/36* (2006.01)
*A63B 53/04* (2015.01)
*A63B 60/46* (2015.01)
*A63B 24/00* (2006.01)

(52) U.S. Cl.
CPC .................. *G06T 7/74* (2017.01); *G06T 7/80* (2017.01); *A63B 53/0408* (2020.08); *A63B 53/0441* (2020.08); *A63B 2024/0028* (2013.01); *G06T 2207/30204* (2013.01); *G06V 2201/12* (2022.01)

(58) Field of Classification Search
CPC .. G06T 7/50; G06T 7/529; G06T 7/55; G06T 7/593; G06T 7/70; G06T 7/73; G06T 7/74; G06T 7/80; G06T 7/85; G06T 7/97; G06T 2207/10004; G06T 2207/10016; G06T 2207/10021; G06T 2207/30204; G06T 2207/30221; G06T 2207/30244; G06K 9/00335; G06K 9/00342; G06K 9/3216; G06K 9/3233; G06K 2009/3225; G06K 2009/3291; A63B 24/0003; A63B 24/0006; A63B 24/0021; A63B 2024/0028; A63B 53/00; A63B 53/0408; A63B 53/0441; A63B 53/047; A63B 60/42; A63B 60/46; A63B 69/36; A63B 69/3605; A63B 69/3614; A63B 69/3632; A63B 71/0622; A63B 2220/18; A63B 2220/805; A63B 2220/806; A63B 2220/807; A63B 2225/02; A63B 2225/50; G01B 5/0023; G01B 11/002; G01B 11/22; G01B 11/26; G06V 10/10; G06V 10/12; G06V 10/147; G06V 10/16; G06V 10/40; G06V 10/44; G06V 2201/12
USPC ....... 382/100, 103, 107, 141, 152, 154, 190, 382/265, 282, 285–288, 291; 473/131, 473/150–152, 219–223, 257, 409; 33/508; 434/252; 356/138, 139.04, 620; 702/150–153
See application file for complete search history.

(56) References Cited

U.S. PATENT DOCUMENTS

| | | | |
|---|---|---|---|
| 6,871,414 B2 | 3/2005 | Burney et al. | |
| 6,993,970 B2 | 2/2006 | Weiss et al. | |
| 7,263,866 B2 | 9/2007 | Latiri | |
| 7,542,130 B2* | 6/2009 | Saegusa | A63B 69/3614 356/28 |
| 7,955,188 B2 | 6/2011 | Bennett et al. | |
| 8,294,958 B2 | 10/2012 | Paterson et al. | |
| 8,409,024 B2* | 4/2013 | Marty | G06V 40/23 382/106 |
| 8,758,151 B2* | 6/2014 | Kimizuka | G06T 7/73 473/409 |
| 9,182,487 B2 | 11/2015 | Troy et al. | |
| 9,427,633 B2 | 8/2016 | Oldknow et al. | |
| 9,452,323 B2 | 9/2016 | Kronenberg et al. | |
| 2004/0114033 A1* | 6/2004 | Eian | H04N 13/261 348/42 |
| 2004/0221464 A1* | 11/2004 | Burney | A63B 60/42 33/508 |
| 2005/0159231 A1* | 7/2005 | Gobush | A63B 24/0021 473/131 |
| 2005/0168578 A1* | 8/2005 | Gobush | H04N 13/218 348/207.99 |
| 2005/0272516 A1* | 12/2005 | Gobush | A63B 24/0006 473/200 |
| 2008/0009348 A1* | 1/2008 | Zalewski | G06F 3/0346 463/40 |
| 2010/0093458 A1 | 4/2010 | Davenport et al. | |
| 2012/0214606 A1* | 8/2012 | Ueda | G06T 7/246 473/199 |
| 2013/0190098 A1* | 7/2013 | Kiraly | G06T 7/248 473/222 |
| 2014/0185867 A1* | 7/2014 | Ishikawa | G06K 9/00342 382/103 |
| 2014/0315654 A1* | 10/2014 | Seluga | A63B 60/42 473/246 |
| 2015/0038249 A1 | 2/2015 | Takao et al. | |
| 2015/0073646 A1 | 3/2015 | Rosenstein et al. | |
| 2018/0185713 A1 | 7/2018 | Long et al. | |
| 2018/0369670 A1* | 12/2018 | Arch | G06T 7/90 |

FOREIGN PATENT DOCUMENTS

| | | |
|---|---|---|
| JP | 2011240016 | 12/2011 |
| JP | 2015009008 | 1/2015 |
| WO | 2014061707 | 4/2014 |

\* cited by examiner

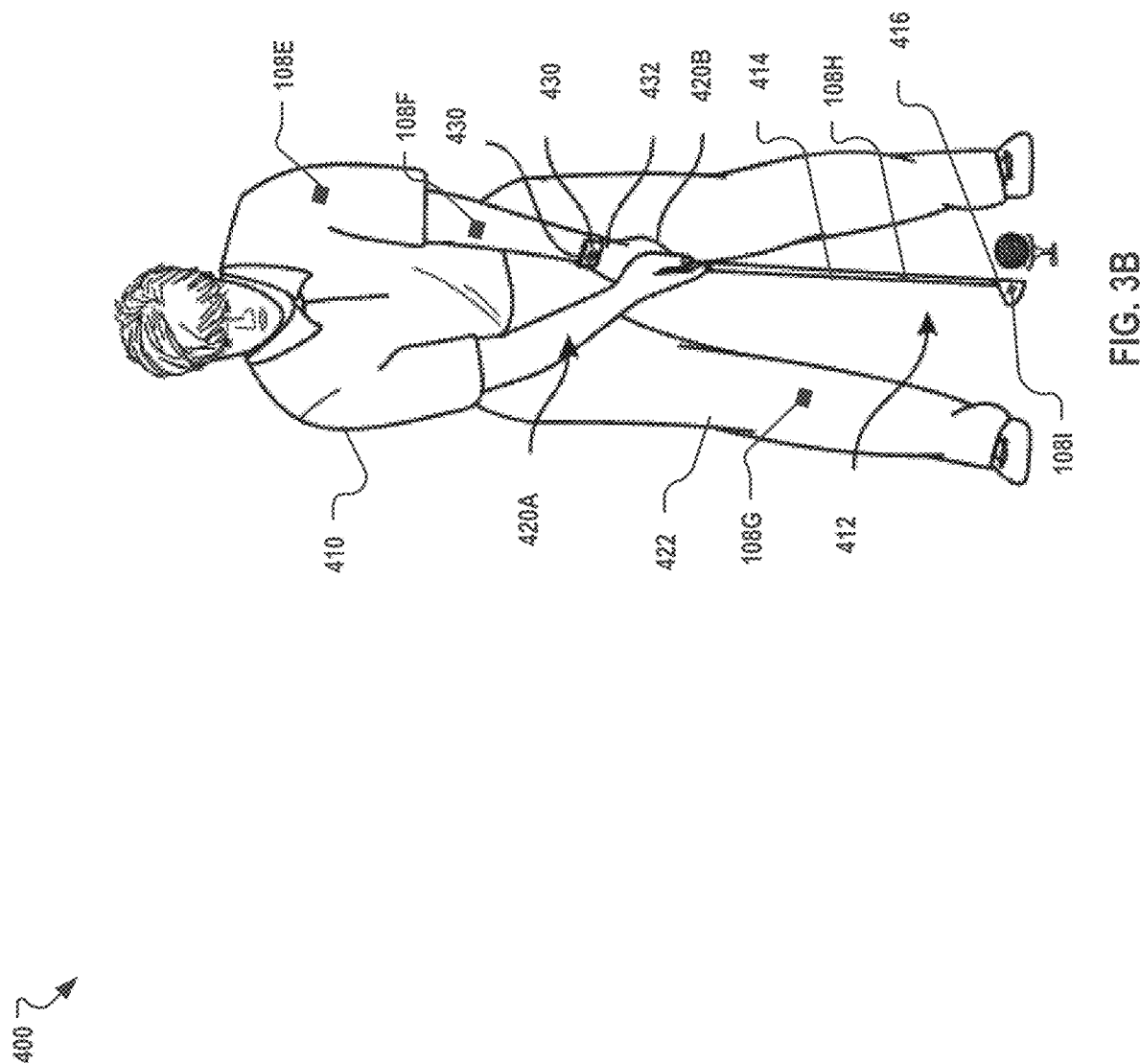

SYSTEMS AND METHODS FOR MEASUREMENT OF 3D ATTRIBUTES USING COMPUTER VISION

CROSS REFERENCE TO RELATED APPLICATIONS

This is a U.S. non-provisional patent application that claims benefit to U.S. provisional patent application Ser. No. 62/684,119 filed on Jun. 12, 2018, which is incorporated by reference in its entirety.

FIELD

The present disclosure generally relates to a computerized system including at least one computing device and camera collectively configured to measure and accommodate the adjustment of predetermined physical attributes associated with a mechanical device (in real time) by predicting three-dimensional (3D) features of the mechanical device based on processed two-dimensional (2D) data associated with the mechanical device.

BACKGROUND

A mechanical device is often subjected to an adjustment phase, during or subsequent to manufacturing of the device, to e.g., configure angles and other dimensions associated with components of the device as desired. For example, the angle of an arm or elongated member relative to a general body of the device or to a selected surface may be adjusted or modified according to predetermined specifications suitable for a particular application. However, the adjustment phase may involve attachment and detachment of the mechanical device to various measuring and adjustment tools, which may cause wear or damage to the device.

As a specific non-limiting example, adjustment of a golf club's attributes (e.g., loft) during manufacturing or otherwise requires the careful application of structural modifications to the club head and the club shaft according to precise measurements. In particular, measurements must be taken after every adjustment of a golf club attribute (e.g., loft angle, lie angle, length, bulge, or roll) to assure proper adjustment. However, tools that measure attributes of a golf club generally require physical contact with the golf club. As such, the golf club is generally transferred to and from multiple times between a measurement tool and an adjustment tool. Accordingly, the golf club may have to be repositioned within the adjustment tool prior to every adjustment. Transferring the golf club multiple times in this manner results in increased task time for manufacturing and can also result in the formation of scratches and wear on the finished golf club product.

It is with these observations in mind, among others, that various aspects of the present disclosure were conceived and developed.

BRIEF DESCRIPTION OF THE DRAWINGS

FIG. 3B is a simplified illustration of applying the system described herein to an actual golfer to enhance swing analysis.

Corresponding reference characters indicate corresponding elements among the view of the drawings. The headings used in the figures do not limit the scope of the claims.

DETAILED DESCRIPTION

Figure 1A:
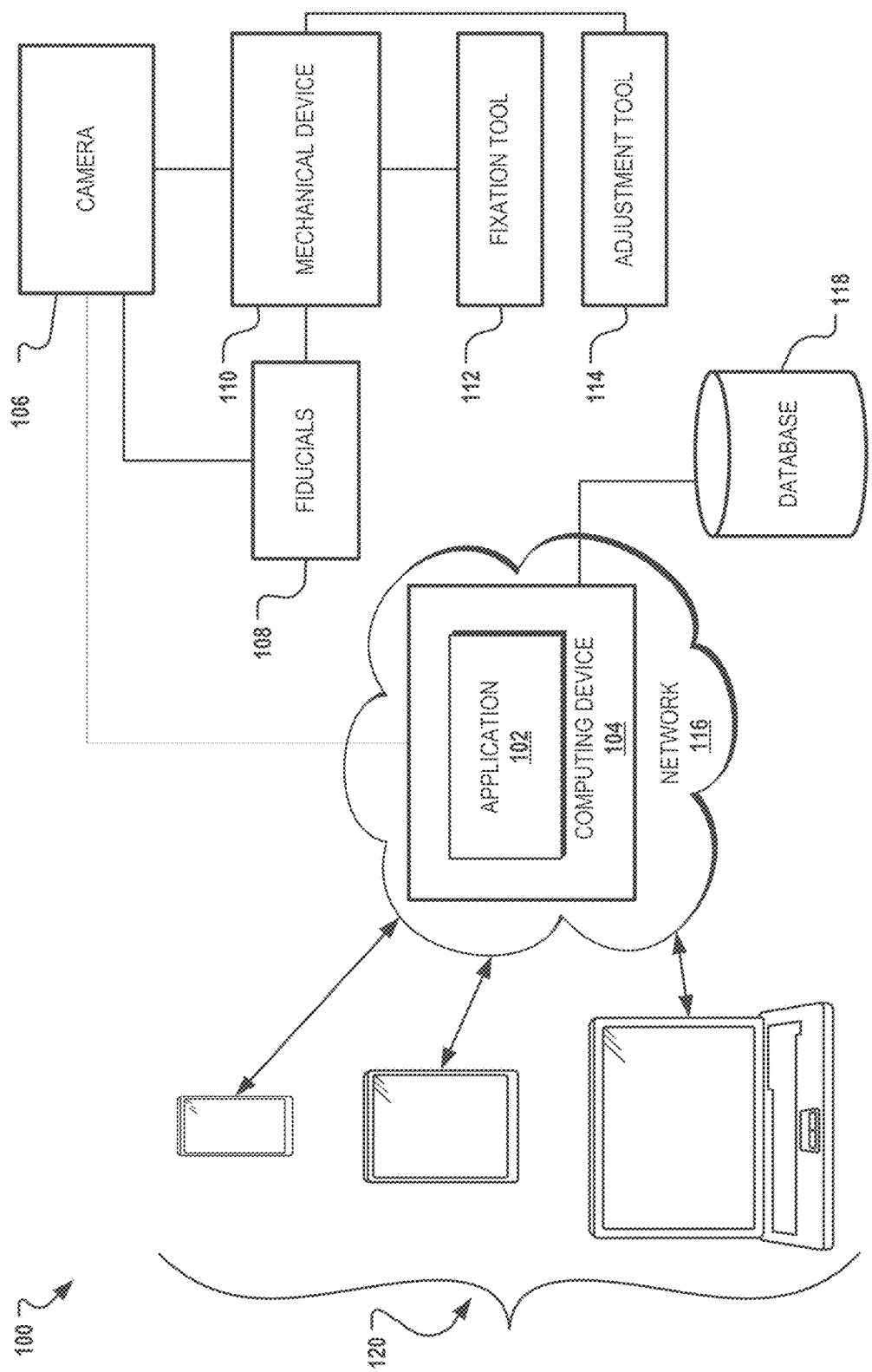
FIG. 1A is a simplified block diagram illustrating a system configured to accommodate the measurement and possible adjustment of a mechanical device according to desired target performance specifications.

In view of the aforementioned, there is a need for technological improvements related to systems for measuring three-dimensional (3D) attributes associated with mechanical devices. Accordingly, aspects of the present disclosure relate to an inventive technological solution in the form of a system including a computing device and/or computer program product configured via an application or otherwise, and at least one camera (integrated with the computing device or separately implemented), where the system is generally configured for measuring 3D attributes related to predefined performance measurements of a mechanical device based on the computation or processing of image data representative of changes to 2D image features associated with the mechanical device (interpreted by real features defined along the device and/or by fiducials positioned along the device).

The present inventive system can improve various aspects of manufacturing and measurement of the mechanical device. More specifically, the system can give the manufacturer a real time reading of the 3D attributes of the mechanical device while in production such that adjustments of the attributes may be made without repositioning the device within an adjustment mechanism after every measurement. Accordingly, the system can reduce task time, the number of adjustments, and wear and scratching of the finished product. Further, the system can improve the quality of the device, lower the operational cost, and reduce fatigue on the technician. Referring to the drawings, embodiments of a system for measuring attributes of a mechanical device in real time are illustrated and generally indicated as 100 and 200 in FIGS. 1-9.

Referring to FIG. 1A, a system 100 for measuring and adjusting attributes of a mechanical device is shown. The system 100 may generally include a measurement and adjustment application 102 (hereinafter "application 102") executed by a computing device 104, a camera 106 (or multiple cameras 106) in operable communication with the computing device 104, and a fiducial 108 (or multiple fiducials 108) defined or positioned along a mechanical device 110. The fiducials 108 may include any object or marker placed in the field of view of the camera 106 or other imaging system which appears in subsequently generated images or image data as a point of reference or a measure (or as an object or set of marks in a reticle of an optical instrument). In some embodiments, the fiducials 108 may include discrete components engageable to portions of the mechanical device 110 such as bar codes, 2D bar codes, solid geometric shapes (e.g., green triangles), or any such component which may be captured or interpreted by the camera 106 and can be represented with pixels of an image generated by the camera 106. Alternatively, the fiducials 108 may include real features defined along the mechanical device 110, such as grooves, ridges, protrusions, printed characters, and the like, which may be used to define a plane, vector, or other attribute.

In some embodiments, the system 100 may further include a fixation tool 112 such as a vise grip for holding the mechanical device 110 in place relative to the camera 106, and may also include an adjustment tool 114 (such as e.g., a bending machine, plyers, a wrench, etc.) for manipulating, bending, or otherwise modifying physical properties of the mechanical device 110. Collectively, the system 100 is configured to accommodate the measurement and adjustment of predetermined properties of the mechanical device 110, as further described herein.

As shown, the computing device 104 may be in operable wireless communication with the camera 106 via a network 116. In other embodiments, the computing device 104 may be in operable communication with the camera 106 by way of a wired connection, or the camera 106 may be integrated with the computing device 104, as further described herein. The computing device 104 may include one or more of a server, controller, a personal computer, terminal, workstation, laptop, mobile device, smartphone, tablet, mainframe, or other such computing device configured by the application 102 or otherwise to implement functionality described herein. The application 102 may be created using different software packages such as Open CV and ArUco tool sets in C++, but the present concept is not limited in this regard. Aspects of the system 100 and/or the application 102 may be provided as a mobile application, using platform as a service (PaaS), and/or software as a service (SaaS) using e.g., Amazon Web Services, or other distributed or decentralized systems. The network 116 may include the Internet, an intranet, a virtual private network (VPN), a local area network (LAN), a wide area network (LAN), a peer-to-peer network, a cloud, and the like. In some embodiments, a cloud (not shown) may be implemented to execute one or more components of the system 100.

As further indicated, the computing device 104 may be in operable connection with or may otherwise have access to a database 118. The database 118 may store information about predetermined or desired properties for the mechanical device 110, virtual objects, and other associated information as described herein. For example, the database 118 may store information about predetermined loft and lie angles suitable for different types of golf clubs. In addition, at least some features of the application 102 may be made available to a plurality of user devices 120 in communication with the computing device 104 via the network 116. The plurality of user devices 120 may include, without limitation, at least one of a controller, a personal computer, terminal, workstation, portable computer, laptop, mobile device, tablet, phone, pager, or multimedia console. Any one of the plurality of user devices 120 may be implemented to e.g., submit requests or information to the computing device 104, e.g., request that the mechanical device 110 be adjusted in some form.

Figure 1B:
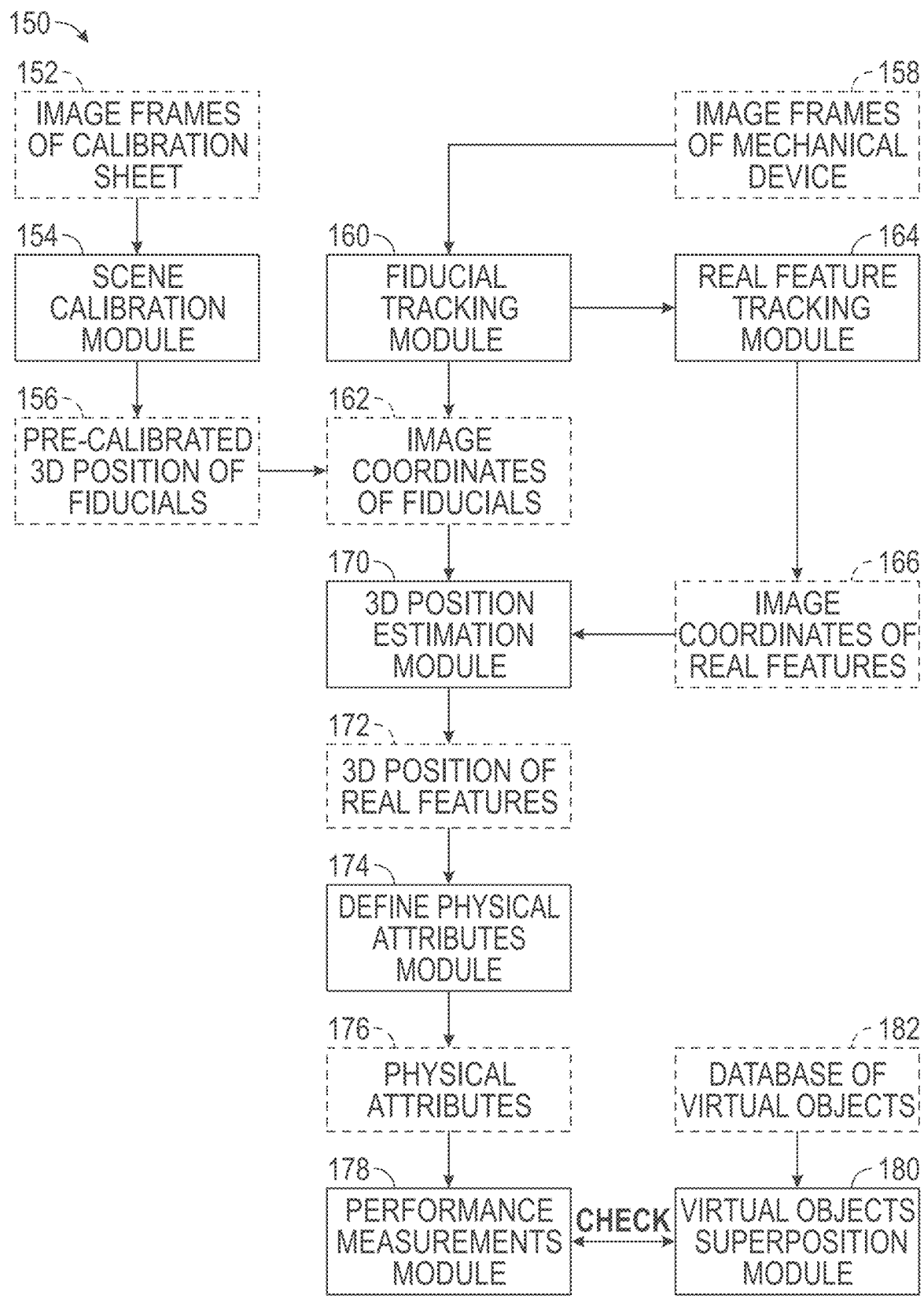
FIG. 1B is flow diagram illustrating the flow logic and relationships between possible modules of an application for assessment and possible adjustment of the mechanical device related to the system of FIG. 1A.

Referring to FIG. 1B, with reference to FIG. 1A, a flow diagram 150 is shown illustrating the creation, processing, and flow of data as the data runs and is processed through a plurality of possible modules associated with the application 102 using the computing device 104 and the camera 106. Utilizing the modules shown, the application 102 is configured to output physical 3-D physical attributes, or other information (such as the relative angle between any surface and a given axis of the mechanical device 110) which may be used to generate performance measurements or information useful for assessing or adjusting the mechanical device 110. In general, the camera 106 may be used to generate calibration image frames 152 associated with a 'Scene Calibration' module 154, in order to assess pre-calibrated 3D positions (156) of the fiducials 108. The fiducials 108 may then be deployed along the mechanical device 110, image frames 158 of the mechanical device 110 may be generated, and a 'Fiducial Tracking' module 160 and/or a 'Real Feature Tracking' module 164 may then be used (in tandem or separately) with the camera 106 to record or identify 2D image coordinates 162 or other 2D image features associated with the fiducials 108. Utilizing the 2D image coordinates 162, a '3D Position Estimation' module 170 associated with the application 102 is configured to subsequently estimate or generate a set of three-dimensional (3D) points/coordinates 172 corresponding to the fiducials 108 and real features of the mechanical device 110. Once such 3D points 172 are created, a 'Define Physical Attributes' module 174 may be implemented which is configured to apply a series of predetermined linear algebraic operations to the 3D points 172 in order to define certain physical attributes 176 of the mechanical device 110. The 'Performance Measurements' module 178 may then utilize data associated with the physical attributes 176 of the mechanical device 110 to output any number or type of performance measurements, as further described herein. In some embodiments, the performance measurements (not shown) may further be checked against predetermined target specifications via a 'Virtual Objects Superposition' module 180 with reference to a database 182 of predefined virtual objects.

Figure 2A:
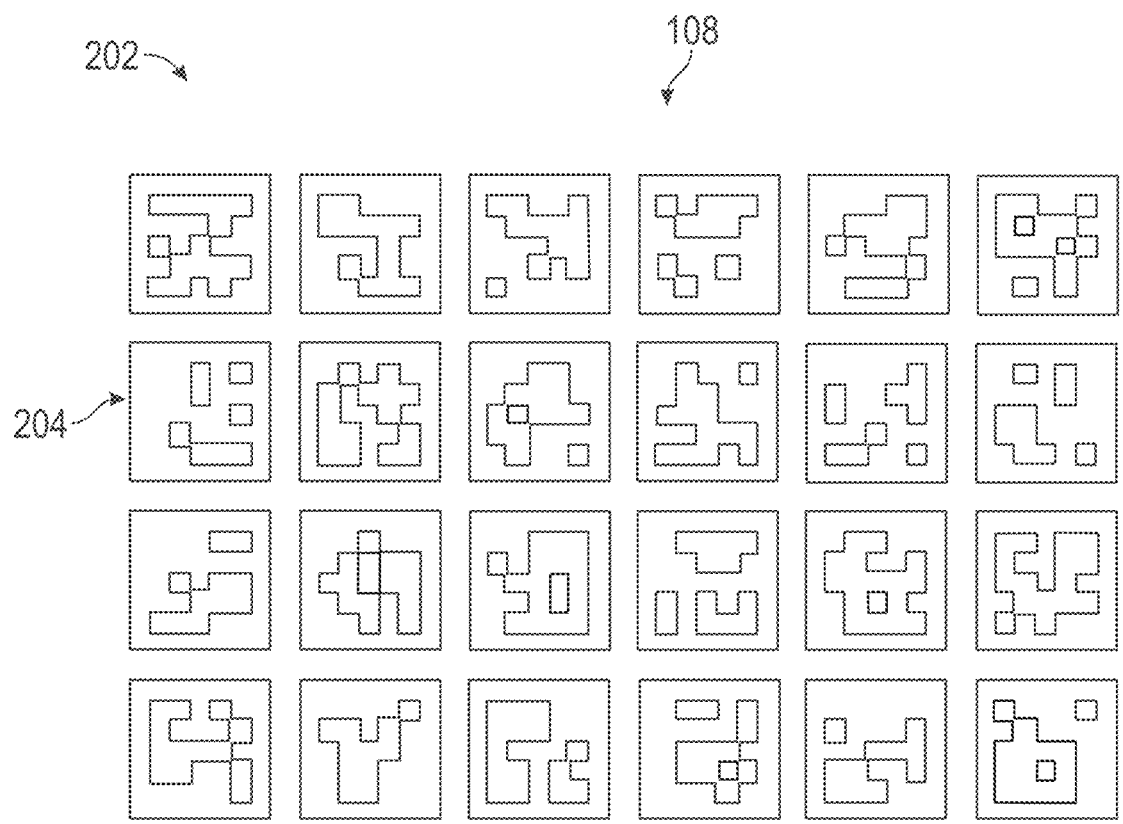
FIG. 2A is an exemplary calibration sheet including an array of fiducials for tracking image features of the mechanical device.
Figure 2B:
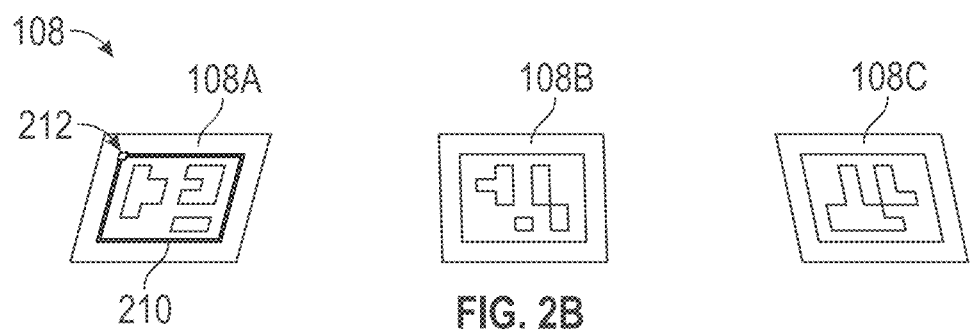
FIG. 2B is a set of fiducials associated with the calibration sheet of FIG. 2A which may be positioned along a mechanical device to measure aspects of the device as described herein.

More specifically, referring to the Scene Calibration module 154 of FIG. 1B, the spatial resolution of the camera 106 may first be calibrated with the fiducials 108. In some embodiments, this may initially include positioning a calibration sheet (202 in FIG. 2A) with an array of the fiducials 108 or fiducials (array of fiducials shown as 204 in FIG. 2A) in front of the camera 106 such that the calibration sheet 202 is oriented towards the camera 106. As illustrated in FIGS. 2A-2B, the fiducials 108 may be 2D images defining a generally square shape and a unique geometry of pixelated black and white patterns. In other embodiments, the fiducials 108 can define any type or particular shape (e.g., circle, rectangle, triangle, pentagon, octagon, or any other shape) or some kind of feature suitable for tracking changes to image data associated with the fiducials 108. The fiducials 108 may further define a surface area. For example, the surface area of the fiducials 108 may include any shape (e.g., square, rectangle, triangle, circle, pentagon, octagon, or any other shape), and may be, e.g., one inch squared. In other examples, the surface area of the fiducials 108 can be scaled up. For example, the surface area of the fiducials 108 may be at least 1 inch squared, at least 1.5 inches squared, at least 1.75 inches squared, at least 2 inches squared, at least 2.25 inches squared, or at least 2.5 inches squared. In other examples, the fiducials 108 can further be scaled down. For example, the surface area of the fiducials may be less than 0.75 inch squared, less than 0.50 inch squared, less than 0.25 inch squared, less than 0.15 squared. In some embodiments, the fiducials 108 may take the form of two-dimensional (2D) quick response (QR) codes (shown in FIGS. 2A-2B), or natural features present or otherwise naturally defined along the mechanical device 110 (not shown).

Referring to FIG. 2B, further possible features of the fiducials 108 are illustrated by the depicted fiducial 108A, fiducial 108B, and fiducial 108C, which may be three examples of the fiducials 108 that may be removed or copied from the calibration sheet 202. As shown by the fiducial 108A, by way of example, the fiducials 108 may include an outline 210 (shown in green) defined along the perimeter of the shape of the fiducial 108, and a dot 212 (shown in red) located at one point on the outline. The outline 210 designates a plane coordinate of the fiducial 108A, while the dot 212 indicates the origin of the plane coordinate. In addition, the unique geometry of pixelated black and white patterns defined by the fiducial 108A and other fiducials 108 may represent different binary codes. The different binary codes may be recognized by the camera 106 and may accommodate the identification and/or determination as to which fiducial 108 is at each which distinct location along the mechanical device 110. In some embodiments, each of the fiducials 108 may be associated with different identifiers. For example, the fiducial 108A may be associated with or define (based on a QR code or otherwise) an identifier of "10"; the fiducial 108B may be associated with or define (based on a QR code or otherwise) an identifier of "40"; and the fiducial 108C may be associated with or define (based on a QR code or otherwise) an identifier of "41."

Returning back to FIG. 1A and FIG. 1B, once the calibration sheet 202 including the fiducials 108 are positioned in front of the camera 106, the position and orientation of the calibration sheet 202 relative to the camera 106 may then be changed over a predetermined period of time, while capturing images or image frames with the camera 106, to generate the calibration image frames 152. In this manner, the actual dimensions of each of the fiducials 108 of the calibration sheet 202 may be used to calibrate the camera 106. The calibration image frames 152 may then be fed to the Scene Calibration module 154 for pre-calibration 156 of the 3D position of the fiducials 108. In other words, the calibration sheet 202 may be used as a reference to compute the initial pose of the camera 106 relative to the fiducials 108 (and/or the reference position of the fiducials 108 relative to the camera 106). Overall, the Scene Calibration module 154 automatically calibrates the camera 106 and lens (not shown) and/or the computing device 104 utilizing the calibration image frames 152, allowing the subsequent modules to compute 3D coordinates for all points of interest along the mechanical device 110. Scene calibration using the Scene Calibration module 154 as described accommodates the ability of the computing device 104 and/or camera 106 to recognize the fiducials 108 in subsequent image frames within the view of the camera 106 regardless of the distance from camera 106.

It should be understood that the camera 106 implemented may include a sole camera or a set of cameras or multiple camera devices operating collectively or independently operated, such that the camera 106 is not limited to any particular number of camera or camera devices capable of capturing image data. The camera 106 may further be any electronic device with a camera (e.g., a mobile device, a tablet, or a laptop) or any camera with a connection to the computer. Further, the camera 106 may be a stereo camera (not shown) configured to capture 3D images. In embodiments using such a stereo camera, the stereo camera can be used independently without the fiducials 108 as correspondence points to produce attribute measurements. In some embodiments, the camera 106 is configured with sufficient resolution to capture the chosen real features or fiducials 108 used to mark the mechanical device 110. Multiple cameras may be used in order to increase the field of view, or to provide a stereoscopic view of the mechanical device 110. In one embodiment, positioning and posing of the camera 106 is done prior to the Scene Calibration module 154 being executed. The real features and/or fiducials 108 used to mark the mechanical device 110 may be represented by pixels in a 2D image, and the application 102 utilizes these 2D images (and observed changes to the same) as described herein. In one embodiment, using a camera 106 capable of capturing high resolution (1920px×1080p) images may improve functionality and output of the application 102 because the fiducials 108 or real features may be represented by a higher number of pixels. In some embodiments, when implementing the camera 106 as a live camera (camera constantly feeding information to the application 102), the image frames 158 are being refreshed at a given rate between 0.1 and 144 Hz. The application 102 may operate on one or more files associated with the image frames 158 in order to convert the image frames 158 to binary (i.e. black and white), sharpen edge resolution, thicken lines, thin lines, etc. in order to perform subsequent measurements or to locate certain features/fiducials 108 within the image frames 158.

Once the scene calibration has been completed, the fiducials 108 may be deployed or positioned along predetermined locations of the mechanical device 110 as desired. Referring to the illustration 300 of FIG. 3A, the fiducial 108A may be deployed along a top portion of a general body 302 of the mechanical device 110, and the fiducial 108B and the fiducial 108C may be positioned along an elongated member 304 extending from the general body 302 of the mechanical device 110 as illustrated. In addition, at least one fiducial 108 may be positioned along a surface 306 such as the fiducial 108D shown. In some embodiments, the fiducials 108 shown may be cut from the calibration sheet 202 and placed along the distinct predetermined locations of the mechanical device 110. The fiducials 108 positioned along the mechanical device 110 may also be copied or duplicated from the calibration sheet 202. The fiducials 108 can be temporarily engaged to surfaces of the mechanical device 110 using tape, a weak adhesive, or by magnetic application. In examples with the fiducials scaled down, the fiducials 108 can be embedded within a coating of the mechanical device 110, or manufactured such that the fiducials are integrated within or along the mechanical device 110. The positions of the fiducial 108A, the fiducial 108B, and the fiducial 108C as shown are merely exemplary and may be re-positioned depending upon the measurements of the mechanical device 110 desired.

Figure 3A:
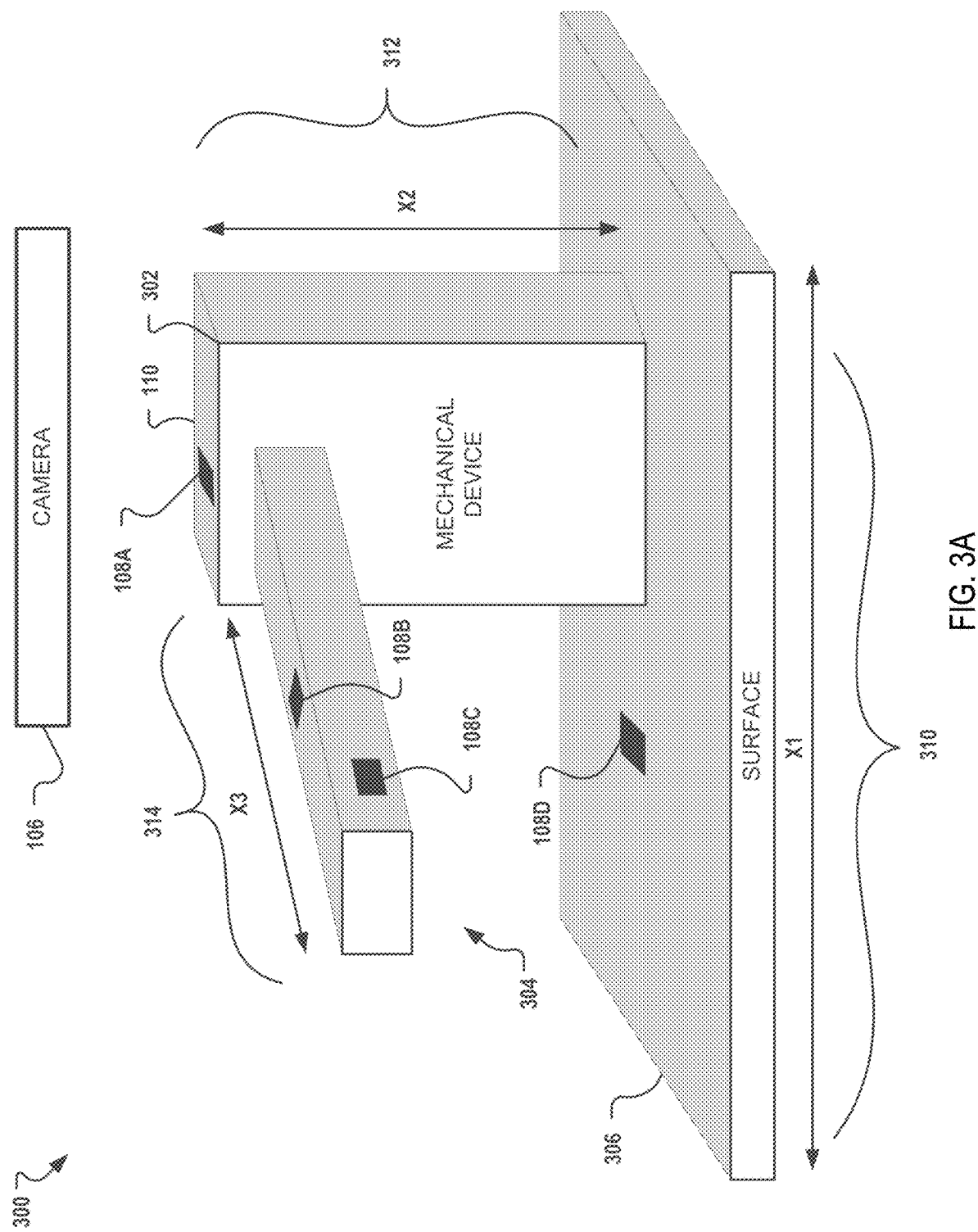
FIG. 3A is a simplified illustration of an exemplary mechanical device which may be measured and adjusted utilizing the system described herein.

In some embodiments, the fiducials 108 illustrated in FIG. 3A accommodate the measurement of the relative angle between the surface 306 (which may be any flat surface) and a given axis defined along the mechanical device 110. For example, the fiducial 108A and the fiducial 108D may be used to measure the relative angle between an axis 310 (X1) defined by the surface 306 and an axis 312 (X2) defined by the body 302 of the mechanical device 110. Similarly, the fiducial 108D, and the fiducial 108B and/or the fiducial 108C may be used to measure the relative angle between the axis 310 defined by the surface 306 and an axis 312 (X3) defined by the elongated member 304 of the mechanical device 110.

Referring back to FIG. 1B, once the fiducials 108 are deployed, one or more images or image frames 158 of the fiducials 108 and the mechanical device 110 may be accessed or captured using the camera 106. The image frames 158 may define two-dimensional image features of the fiducials 108 and the mechanical device 110, and/or two dimensional image features associated with natural or real features (at predetermined locations) of the mechanical device 110.

Using the Fiducial Tracking module 160, the 2D positions of the fiducials 108 in the image frames 158 may be recorded or otherwise identified for use in the 3D Position Estimation module 170. Similarly, in other embodiments, the Real Feature Tracking module 164 may be used to record or identify the 2D image positions of predetermined real features of the mechanical device 110 within the image frames 158. At this stage, the camera 106 may continuously track the fiducials 108 as long as the mechanical device 110 remains within the image frame. In other words, the pose of the camera 106, calculated by the Scene Calibration module 154, may be used to calibrate the fiducials 108 and/or real features within the natural scene and may be tracked over an extended set of frames. Positions and rotations of the fiducials 108 are reported in the camera coordinate frame of the image frames 158.

The 3D Position Estimation module 170 may then be configured to import data produced in the previous modules of FIG. 1B in order to estimate the 3D positions/coordinates 172 of all fiducials 108 (and real features). A recursive filter, such as a Kalman filter, may be used to estimate the 3D positions 172 of new points along the mechanical device 110 based on pose of the camera 106 and the measurements of 2D image coordinates 162 of fiducials/features.

Once the 3D points 172 are generated, the 'Define Physical Attributes' module 174 may be implemented which is configured to apply a series of predetermined linear algebraic operations to the 3D points 172 in order to define or identify certain physical attributes 176 of the mechanical device 110. The 'Performance Measurements' module 178 may then be implemented to process or apply the data associated with the physical attributes 176 of the mechanical device 110 with additional predefined functions to output any number or type of performance measurements, as further described herein. As one example, the relative angle of the elongated member 304 of the mechanical device 110 relative to the surface 306 may be determined using the functionality of FIG. 1B. In this example, where the mechanical device 110 is a gun, and the elongated member 304 is a gun barrel, this angle may be useful as an input to another function for determining e.g., the distance a bullet or other projectile is expected to travel when released through the elongated member 304. In either case, utilizing the modules of FIG. 1B, the application 102 is configured to output physical 3-D physical attributes, or other information (such as the relative angle between any surface and a given axis of the mechanical device 110) which may be used to generate performance measurements 178 or information useful for assessing or adjusting the mechanical device 110.

Numerous additional applications of the system 100 are contemplated. In some embodiments, a set of fiducials may be placed as stickers on various parts of a golf club, bat, hockey stick, or other sporting equipment for use in fitting for swing analysis. The fiducials may be read by a camera and their assigned identifiers may be fed as input into the system 100. The system 100 may then be used to analyze the initial body motions on the downswing, club-head orientation at different swing segments, and overall consistency of the swing. During analysis, the system 100 may assign a value during fittings or lessons which a player may be able to see and implement to improve performance.

More specifically, referring to the illustration 400 of FIG. 3B, any number of the fiducials 108 may be aligned along various parts of a user 410 and/or a golf club 412 in order to analyze initial body motions on the downswing, club head orientation at different swing segments, and overall consistency of the swing of the golf club 412, the golf club 412 generally defining a shaft 414, and club head 416. For example, in the illustration 400, a fiducial 108E may be aligned along an upper portion of the user 410 such as the shoulder. In this example, the fiducial 108E may be attached to a garment worn by the user 410 or integrated/sewn into the garment. In some embodiments, a fiducial 108F may be aligned along one or more arms 420 of the user, such as the left arm 420B as shown. One or more of a fiducial 108G may also be aligned along one or more of a leg 422 of the user 410. Any number of the fiducials 108 may be implemented for swing analysis depending upon the desired output.

In addition, any number of the fiducials 108 may be aligned along the golf club 412. As shown in FIG. 3B, a fiducial 108H may be aligned along the shaft 414, and a fiducial 108I may be aligned along the head 416, but the present disclosure is not limited to this configuration. In some embodiments, a smart watch 430 or other wearable device may be implemented with the system 100. For example, the smart watch 430 may be implemented to digitally display one or more of the fiducials 108 along the wrist 432 of the user 410, for capture by the camera 106 and interpretation by the computing device 104 of FIG. 1A as described herein. The smart watch 430 may also be implemented to provide additional input data for the computing device 104 for swing analysis or for modifying physical attributes of the club 412, in conjunction with the functionality described herein. In some embodiments, the smart watch 430 may include an APPLE WATCH® digital watch from Apple Inc., Cupertino, Calif., equipped with a plurality of sensors (e.g. accelerometers, gyros, magnetometer) in configured to measure backswing time, downswing time, tempo (the ratio of backswing time to downswing time), and other characteristics of the swing of the golf club 412 by the user 410.

In some embodiments, upon conducting swing analysis, the system 100 may output one or more swing analysis input values which may be leveraged during fittings of the club 412. Specifically, the system 100 may utilize the swing analysis input values as an input to a set of predetermined functions comprising a series of predetermined linear algebraic operations. As further described herein (e.g., FIG. 4), the linear algebraic operations in turn may provide one or more output values corresponding to measurements of physical attributes of the golf club 412 that are optimal for the user 410, such as the relative angle between the club shaft 414 and the club head 416. In some embodiments, the system 100 applies a three dimensional function which takes as input a set of coordinates (derived from a set of the fiducials 108 or otherwise) representing a predetermined origin of a local coordinate system and a second set of coordinates representing a point on the club 412. The second set of coordinates may correspond to the position of a fiducial along the shaft 414 of the club 412. This three dimensional function finds the distance between each respective coordinate, such that the distance between the origin coordinate representing the horizontal point of the origin and the coordinate representing a horizontal point along the shaft 414 is found, the distance between the origin coordinate representing the vertical point of the origin and the coordinate representing a vertical point along the shaft 414 is found, and the distance between the origin coordinate representing the point on the axis perpendicular to the horizontal and vertical axis at the origin and the coordinate representing a point on the axis perpendicular to the horizontal and vertical axis at a point along the shaft 414 is found. The output of this three dimensional function is a set of coordinates representing a vector of a shaft axis of the club 412. Another function may be applied which performs a cross product operation on an input comprising a set of points defining a plane on a face or head 416 of the club 412 and may generate as an output a normal vector to the plane. Finally, the lie and loft of the club 412 may be calculated by inputting into an arc function, such as arctan, a ratio of vectors corresponding to points on the club 412.

For example, the set of points representing the predetermined origin of a local coordinate system may be (0, 0, 0). The set of points representing a point on the club 412 can be chosen to be (10, 20, 30). Applying the three dimensional function, the set of coordinates representing the vector of the shaft axis of the club 412 is found to be (10, 20, 30)−(0, 0, 0)=(10, 20, 30).

If a plane on the face of the club 412 is defined by points A=(2, 2, 3), B=(1, 0, 1), and C=(−1, 3, 4), the coordinates of the normal vector to the plane, represented by the variable F, may be calculated as follows:

$$AB \times AC = F$$

$$((1,0,1)-(2,2,3)) \times ((-1,3,4)-(1,0,1)) = F$$

$$(-1,-2,-2) \times (-2,3,3) = F$$

$$(0,7,-7) = F$$

Therefore, the coordinates of the vector normal to the chosen points on the face of the club 412 is (0, 7, −7).

Finally, if the ratio of coordinates used as input to find the lie is 0.88, then the lie may be arctan(0.88) which is equal to 0.73 radians, which is approximately 41.63 degrees. Likewise, if the ratio of coordinates used as input to find the loft is 0.45, then the loft may be arctan(0.45), which is equal to 0.42 radians, which is approximately 24.23 degrees.

The system 100 may further be implemented to improve gripping during the manufacturing of golf clubs or other clubs, bats, or hockey sticks used as sporting equipment. Currently, club gripping may often be performed using the human eye. This method results in different grippers producing inconsistent products. By applying the system 100 not only to the loft/lie process but also to the gripping process, assembly time may be reduced and consistency between products may substantially increase. Other golf-related applications are contemplated.

In some embodiments, one further application of the system 100 may be in the field of construction. Specifically the system 100 may be implemented by framers to calculate the angle of one stud with respect to another stud and to calculate the distance between studs to ensure more consistent spacing between studs and to ensure that the studs are level with one another. For a typical framer who must often frame hundreds of houses in a short period of time, the speed at which the system 100 may calculate the angle and distance between separate studs could result in significant savings in labor time and costs. The system 100 may also serve to reduce labor time and costs when applied to robotics during manufacturing processes. Fiducials 180 may be placed or aligned on components so that a robot in a manufacturing environment may pick up a sheet of material or finished part and use input provided by the fiducial to properly orient the sheet of material or finished part for assembly or another task. In this application, the fiducials 108 may contain a QR code defining an identifier associated with a set of instructions instructing the robot on how to properly orient the associated sheet of material or finished part.

As another example, utilizing the system 100, the angle between a gun barrel or arrow shaft and a flat target placed some pre-determined distance away may be computed. In this manner, gun/archery enthusiasts may benefit from having the ability to better align their weapon. As another example, the angle between a paint gun and a chosen surface may be computed. Because auto manufacturers use robot arms to paint car bodies, this may enable the manufacturers to have closed-loop feedback for the spray angle between the paint gun and the car body surface. In addition, the disclosed computer vision may be suitable for detecting voids in the opaque paint layer of a car body. As another example, the angle and distance between a landing gear on a strut of a helicopter or airplane and an approaching landing pad or runaway may be calculated. This may provide closed-loop automatic control during landing to safeguard passengers, and could be used to provide warning if the landing pad or runaway is tilted (e.g. landing a helicopter on a cruise ship during stormy weather when the deck of the ship is akimbo).

Further, the system 100 may also be used for data acquisition in motorsports. The fiducials 180 in the form of stickers or otherwise may be placed on key parts of a vehicle. The fiducials 180 may be scanned by a camera in communication with the system 100. The system 100 may then use as input any identifiers associated with the fiducials 180 to analyze vital measurements and determine if a car is conforming to the rules and regulations associated with its respective motorsport. The system 100 may use the inputs to analyze, among other things, the vehicles dynamic suspension angles. The system 100 may further record the suspension travel around a variety of cornering scenarios. With respect to any of the above possible applications of the system 100, the fiducials 108 may be replaced in whole or in part by real features present along the device or object analyzed, and changes to the position, orientation, and other attributes of the real features may be interpreted using the camera 106 or otherwise, as described herein.

Figure 4:
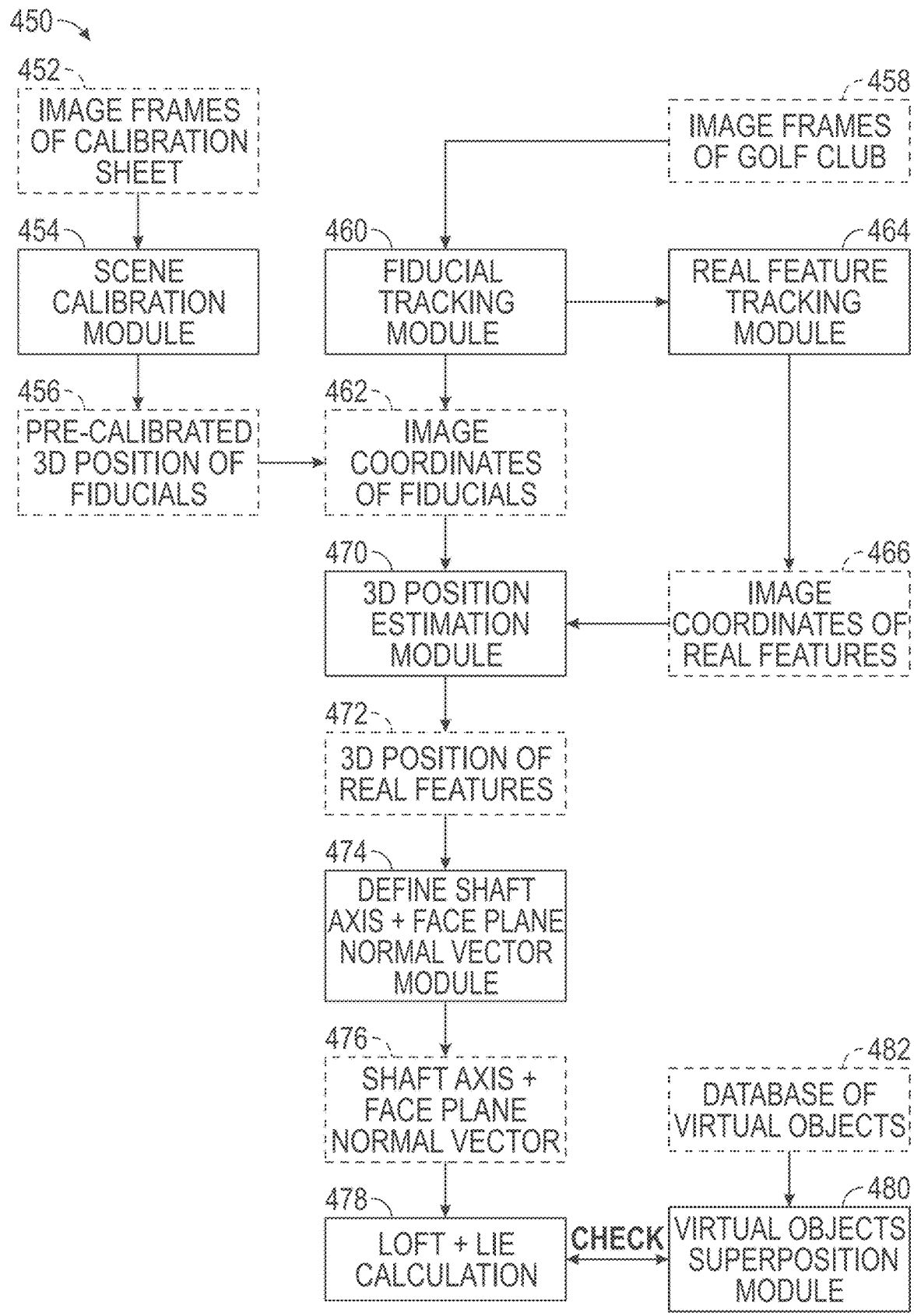
FIG. 4 is flow diagram illustrating the flow logic and relationships between possible modules of an application for assessment and possible adjustment of a particular mechanical device, e.g., a golf club, using the system of FIG. 1A.
Figure 5:
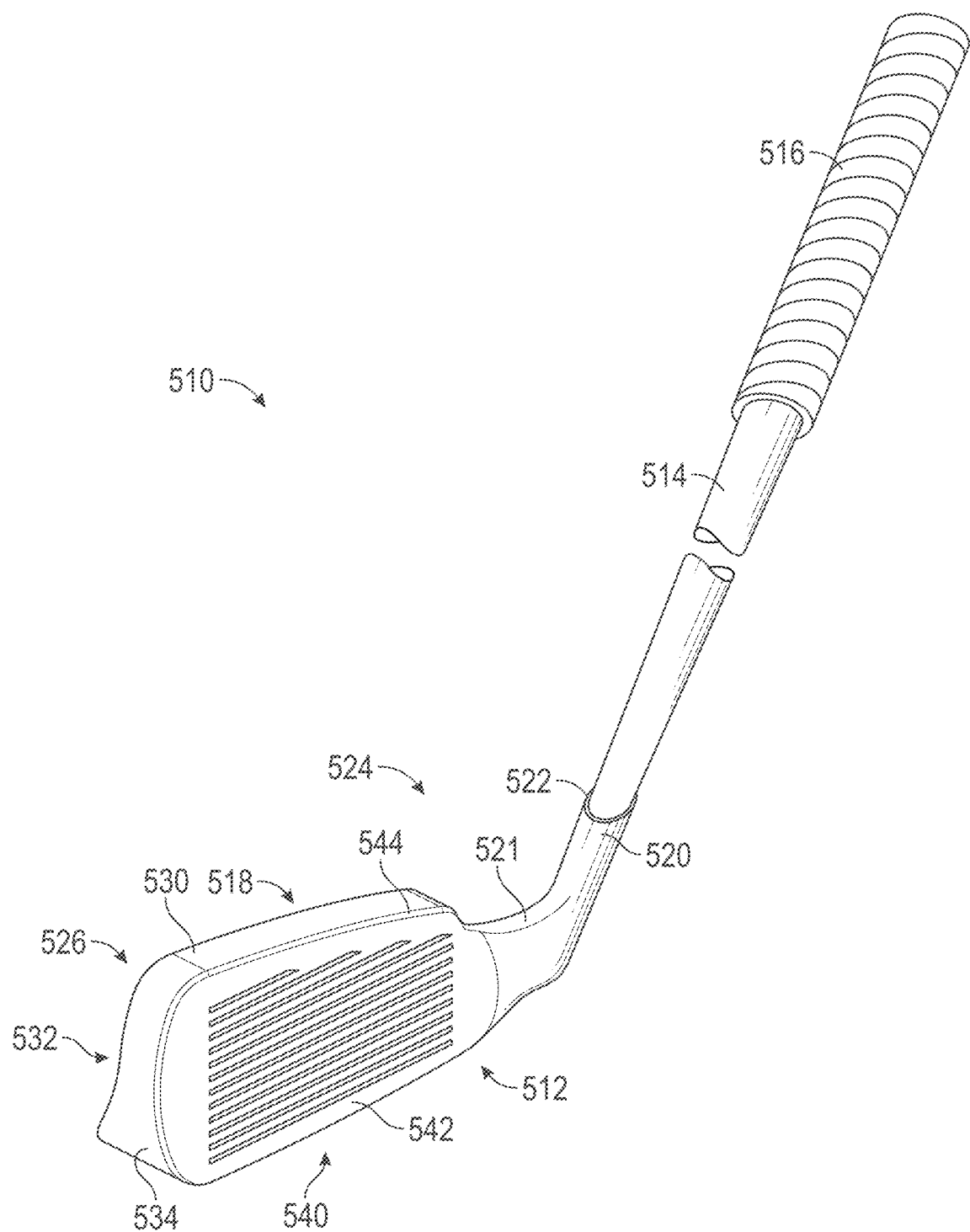
FIG. 5 is a perspective view of the golf club referred to in FIG. 4.

Referring to FIG. 4, a flow diagram 450 (similar to the flow diagram 150) is shown illustrating the implementation of a plurality of other possible modules associated with the application 102 and other functionality for creation, processing, and flow of data (using the computing device 104 and camera 106) to measure aspects of a specific non-limiting embodiment of the mechanical device 110 in the form of a golf club (510 in FIG. 5). As indicated in the following description of the flow diagram 450, measurement of the golf club 510 may utilize aspects of the system 100 of FIG. 1A and the calibration sheet 202 and fiducials 108 of FIGS. 2A-2B to measure and adjust the loft and lie angles of the golf club 510, while reducing task time, reducing wear and tear and damage to the golf club 510 during measurement and adjustment.

In general, the camera 106 may be used to generate calibration image frames 452 associated with a 'Scene Calibration' module 454, in order to assess pre-calibrated 3D positions (456) of the fiducials 108. The fiducials 108 may then be deployed along predetermined locations of the golf club 510, image frames 458 of the golf club 510 may be generated, and a 'Fiducial Tracking' module 460 and/or a 'Real Feature Tracking' module 464 may then be used (in tandem or separately) with the camera 106 to record or identify 2D image coordinates 462 or other 2D image features associated with the fiducials 108. Utilizing the 2D image coordinates 462, a '3D Position Estimation' module 470 associated with the application 102 is configured to subsequently estimate or generate a set of three-dimensional (3D) points/coordinates 472 corresponding to the fiducials 108 and real features of the golf club 510. Once such 3D points 472 are created, a 'Define Shaft Axis+Face Place Normal Vector' module 474 may be implemented which is configured to apply a series of predetermined linear algebraic operations (represented as "Define Shaft Axis+Face Place Normal Vector" in 474) to the 3D points 472 in order to define the center axis of the golf club shaft, a plane parallel to the face of the golf club 510, and a normal vector to that plane 476. A 'Loft+Lie Calculation' module 478 may then utilize the aforementioned data to output a loft and lie in degrees associated with the golf club 510. In some embodiments, the loft and lie in degrees associated with the golf club 510 may further be checked against predetermined target specifications via a 'Virtual Objects Superposition' module 480 with reference to a database 482 of predefined virtual objects associated with golf clubs and golf club fitting.

More specifically, referring to the Scene Calibration module 454 of FIG. 4, the spatial resolution of the camera 106 may first be calibrated with the fiducials 108. In some embodiments, this may initially include positioning the calibration sheet (202 in FIG. 2) with an array of the fiducials 108 or fiducials (array of fiducials shown as 204 in FIG. 2A) in front of the camera 106 such that the calibration sheet 202 is oriented towards the camera 106. The fiducials 108 may take numerous forms and shapes as described herein, and in some embodiments, the fiducials 108 may take the form of two-dimensional (2D) quick response (QR) codes (shown in FIGS. 2A-2B), or natural features present or otherwise naturally defined along the golf club 510 (not shown).

Returning to FIG. 4, once the calibration sheet 202 including the fiducials 108 are positioned in front of the camera 106, the position and orientation of the calibration sheet 202 relative to the camera 106 may then be changed over a predetermined period of time, while capturing images with the camera 106, to generate the calibration image frames 452. In this manner, the actual dimensions of each of the fiducials 108 of the calibration sheet 202 may be used to calibrate the camera 106. The calibration image frames 152 may then be fed to the Scene Calibration module 454 for pre-calibration 456 of the 3D position of the fiducials 108. In other words, the calibration sheet 202 may be used as a reference to compute the initial pose of the camera 106 relative to the fiducials 108 (and/or the reference position of the fiducials 108 relative to the camera 106). Overall, the Scene Calibration module 454 automatically calibrates the camera 106 and lens (not shown) and/or the computing device 104 utilizing the calibration image frames 452, allowing the subsequent modules to compute 3D coordinates for all points of interest along the golf club 510 as further described herein. Scene calibration using the Scene Calibration module 454 as described accommodates the ability of the computing device 104 and/or camera 106 to recognize the fiducials 108 in subsequent image frames within the view of the camera 106 regardless of the distance from camera 106. The camera 106 may take numerous different forms, may capture images, image frames, or live streaming data (defining image frames) and may include one or more cameras, as further described herein.

Once the scene calibration has been completed, the golf club 510 may then be prepared for deployment and measurement. Referring to FIG. 5, the golf club 510 may generally include a golf club head 512 (which may be iron-type) and a golf dub shaft 514. The golf dub head 512 is coupled to one end of the golf dub shaft 514 and a grip 516 is coupled to an opposing end of the golf dub shaft 514. Suitable materials for the golf dub shaft 514 may include steel and graphite. Although the golf dub head 512 is shown as an iron-type golf dub head, it may also be a putter or a wood-type dub head in other embodiments without departing from the scope of the inventive concept described herein.

The golf dub head 512 includes a body 518 and a hosel 520, which has a cylindrical bore 522 for receiving one end of the golf dub shaft 514. The body 518 defines a heel end 524 spaced apart from a toe end 526. A sole (not shown in FIG. 5) extends from a lower portion of the heel end 524 to a lower portion of the toe end 526 and a top rail 530 extends from an upper portion of the heel end 524 to an upper portion of the toe end 526. The body 518 has a back surface 532 that extends between the heel end 524 and the toe end 526 along a back or rear portion of the body 518. The body 518 further includes a front surface 534 that extends between the heel end 524 and the toe end 526. The hosel 520 includes a neck 521 connected to the heel end 524 of the body 518. The neck 521 has a notch (not shown) in the lower surface of the neck 521. The golf club head 512 may further include a golf dub face plate 540 having a front surface 542 and a back surface 544. The dub head 512 may be formed by casting, machining from solid castings, or the like. Suitable materials for the dub head 512 include, but are not limited to, stainless steel, titanium, aluminum, nickel, alloys of titanium, alloys of aluminum, alloys of nickel, and the like.

Figure 6A:
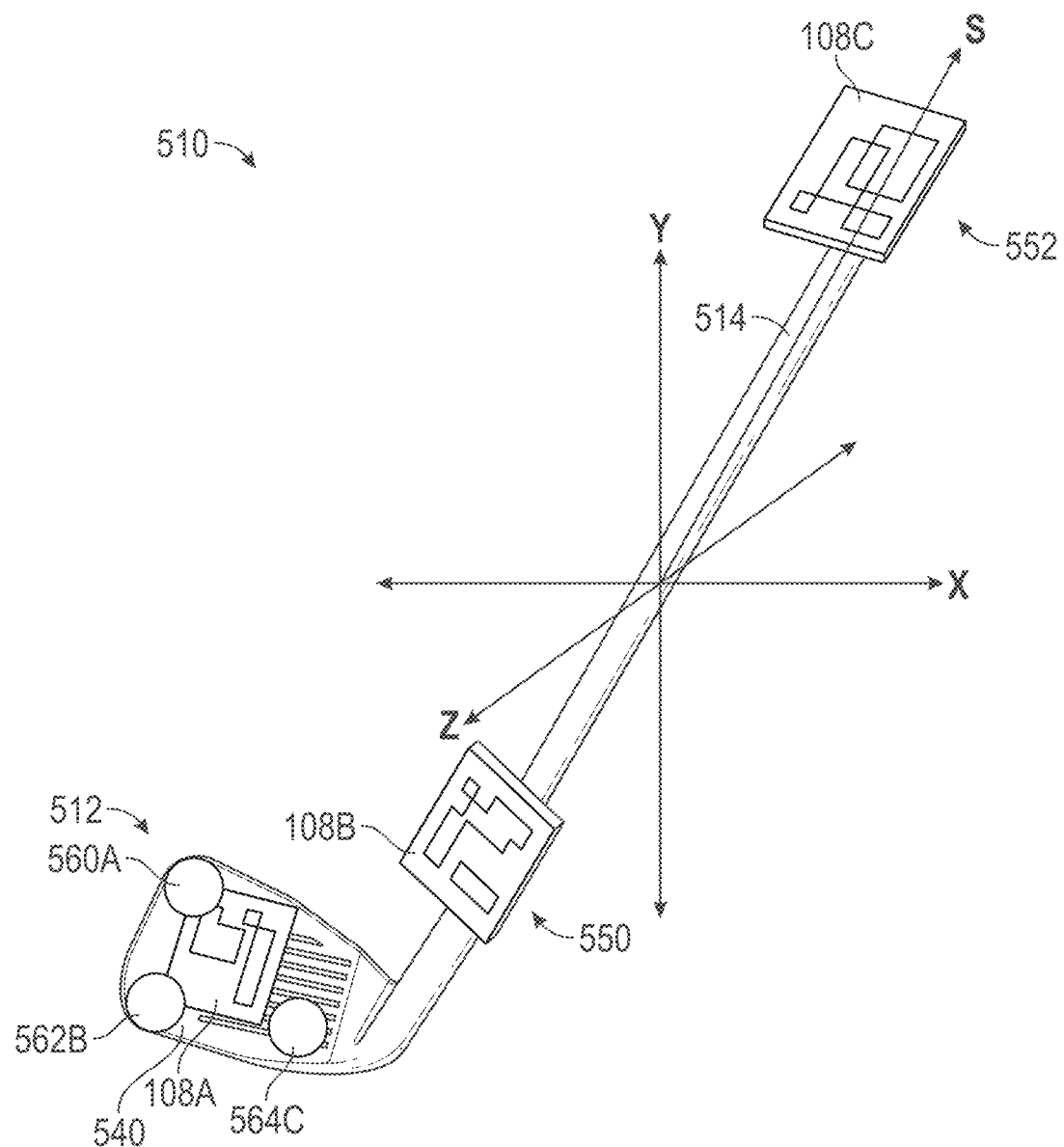
FIG. 6A is a perspective view of the golf club referred to in FIG. 4 with fiducials positioned along the golf club.
Figure 6B:
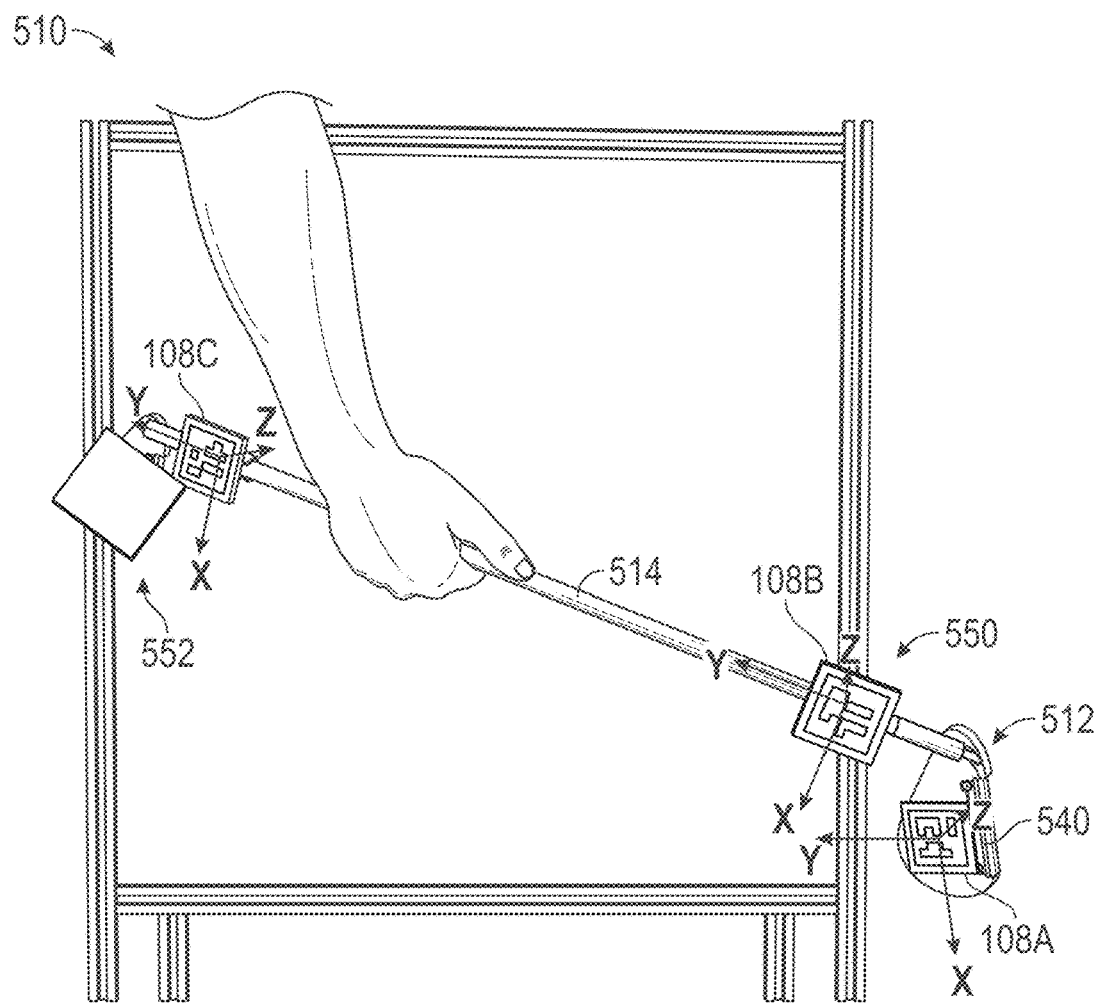
FIG. 6B is another perspective the golf club referred to in FIG. 4 with fiducials positioned along the golf club.

Prior to generation of the image frames 458 of the golf club 510, the fiducials 108 (which may be the same fiducials used for scene calibration) can be placed, engaged, or otherwise positioned along distinct predetermined locations on the golf club 510 at any time or prior to being placed into the adjustment tool 114. Referring to FIGS. 6A-6B, in one example, at least three of the fiducials 108 may be placed in at least three distinct locations on the golf club 510. A first fiducial, such as the fiducial 108A of FIG. 2B, may be placed on the golf dub face plate 540 of the golf club head 512. A second fiducial, such as the fiducial 108B of FIG. 2B, may be placed on a first end 550 of the golf club shaft 514, proximate to the golf club head 512. A third fiducial, such as the fiducial 108C of FIG. 2B, may be placed on a second end 552 of the shaft 514, opposite the first end 550. The first fiducial (108A) indicates a face plane of the face plate 540 of the golf club 510. The second and third fiducials (108B and 108C) indicate a centerline axis of the shaft 514 of the golf club 510. Identification or observation of the face plane in reference with the centerline axis of the shaft 514 accommodates the application 102 to determine the loft angle, and lie angle of the golf club head, as further described herein. The second and third fiducials (108B and 108C) further accommodate the application 102 to determine the length of the shaft 514.

In other examples, the fiducials 108 can include any number (e.g., at least four fiducials, at least five fiducials, at least six fiducials, at least seven fiducials, at least eight fiducials, at least nine fiducials, at least 10 fiducials, at least 11 fiducials, at least 12 fiducials, or at least 13 fiducials). Increasing the amount of the fiducials 108 deployed may increase the accuracy of the application 102 to measure aspects of the golf club 510. Further, increasing the amount of the fiducials 108 can allow for the application 102 to measure other attributes such as the roll and bulge of the golf club. In some embodiments, the orientation of the fiducials 108 on the face plate 540 can be aligned with one edge of the fiducials 108 parallel with a plurality of grooves located on the face plate 540 of the golf club head 512. In other examples, the fiducials 108 on the face plate 540 are not required to be aligned with the plurality of grooves of the golf club head 512. The orientation of the fiducials 108 on the shaft 514 can be in any orientation, as long as there are at least two fiducials 108 located on the shaft 514.

In some embodiments, the fiducials 108 shown may be cut from the calibration sheet 202 and placed along the distinct predetermined locations of the golf club 510 shown. The fiducials 108 positioned along the golf club 510 may also be copied or duplicated from the calibration sheet 202. The fiducials 108 can be temporarily engaged to surfaces of the golf club 510 using tape, an adhesive, or by magnetic application. In examples with the fiducials scaled down, the fiducials 108 can embedded within a coating of the golf club 510, or manufactured such that the fiducials are integrated within or along the golf club 510. The fiducials 108 may further be placed onto the shaft 514 of the golf club 510 by adhering the fiducials 108 onto a flat surface that has an attachment mechanism (e.g. snap clamp) that attaches to the shaft 514. The fiducials 108 can further be placed onto the shaft 514 of the golf club head 512 by a magnet as well. The positions of the fiducial 108A, the fiducial 108B, and the fiducial 108C as shown are merely exemplary and may be re-positioned where different measurements of the golf club 510 are desired. In one embodiment, the fiducials 108 may be printed and measured prior to being applied or positioned along the golf club 510.

Figure 6C:
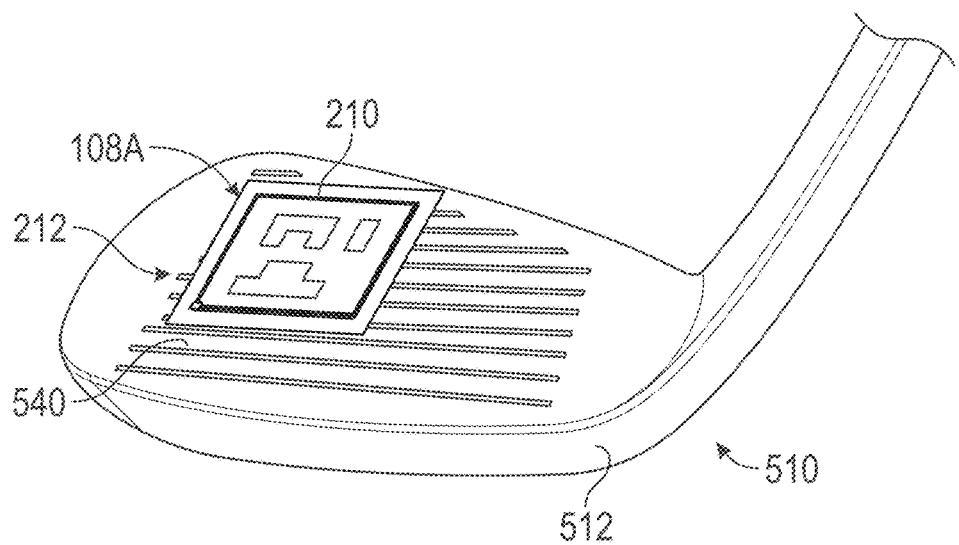
FIG. 6C is an enlarged detailed view of the club head of the golf club of FIG. 5B with a fiducial positioned along the face of the golf club.

Referring to FIG. 6C, the fiducial 108A (and other fiducials 108) may generally define a square shape and a unique geometry of pixelated black and white patterns. In other embodiments, the fiducials 108 can include of any shape (e.g., circle, rectangle, triangle, pentagon, octagon, or any other shape). In some embodiments, the fiducials 108 further include the outline 210 along the perimeter of the shape of the fiducial 108 (previously shown in FIG. 2B), and the dot 212 located at one point along the outline 210. The outline 210 designates a plane coordinate of the fiducial 108, while the dot 212 indicates the origin of the plane coordinate. The unique geometry of pixelated black and white patterns represents different binary codes. The different binary codes are recognized by camera 106 after scene calibration such that the computing device 104 and camera 106 are configured to identify which fiducial 108 is at each distinct location on the golf club 510.

Referring back to FIG. 4, once the fiducials 108 are deployed, the two-dimensional positions of the fiducials 108 may be recorded, and/or one or more images or image frames 458 of the fiducials 108 and the golf club 510 may be accessed or captured using the camera 106. The image frames 458 may define two-dimensional image features or image coordinates 462 of the fiducials 108 and the golf club 510, and/or two dimensional image features associated with natural or real features (at predetermined locations) of the golf club 510. The image frames 458 may further define the 2D image positions of the grooves of the club face 540 and perimeter points along the entire golf club 510 within the image frame. The camera 106 may continuously track the fiducials 108 or natural features of the golf club 510 as long as the club 510 remains within an image frame. In other words, using the Fiducial Tracking module 460, the 2D positions of the fiducials 108 in the image frames 458 may be recorded or otherwise identified for use in the 3D Position Estimation module 470. Similarly, in other embodiments, the Real Feature Tracking module 464 may be used to record or identify the 2D image positions of predetermined real features of the golf club 510 within the image frames 458. Positions and rotations of the fiducials 108 are recorded in the camera coordinate frame of the image frames 458.

The 3D Position Estimation module 470 may then be configured to import data produced in the previous modules of FIG. 4 in order to estimate the 3D positions/coordinates 472 of all fiducials 108 (and real features). A recursive filter, such as a Kalman filter, may be used to estimate the 3D positions 472 of new points along the golf club 510 based on pose of the camera 106 and the measurements of 2D image coordinates 462 of fiducials/features.

Once the 3D points 472 are generated or otherwise determined, the 'Define Shaft Axis+Face Plane Normal Vector' module 474 may be implemented which is configured to apply a series of predetermined linear algebraic operations to the 3D points 472 in order to estimate the shaft axis, the face plane, and the normal vector (shown in 476). In one embodiment, the vector of the shaft axis (S in FIG. 6A) may be calculated as:

$$S=(xi,yj,zk)-(x',y',z'),$$

where (x', y', z') is defined as the origin of the local coordinate system. Three points, A, B, and C (shown in FIG. 6A as 560, 562, and 564, respectively) on the face 540 of the club 510 are used to define a plane on the face.

A normal vector to that plane, F, can be computed as:

$$AB \times AC = F$$

where AB and AC are vectors pointing from A to point B and C, respectively.

Finally, the 'Loft+Lie Calculation' module 478 may be configured to calculate the lie of the club as:

$$\text{Lie} = \left| \arctan\left[\frac{S \cdot j}{S \cdot i}\right] \right|,$$

and the loft as:

$$\text{Loft} = \left| \arctan\left[\frac{F \cdot j}{F \cdot k}\right] \right|.$$

In this way, the application 102 is configured to calculate loft and lie (as vector projections) within a large range of club orientations and club positions relative to the camera 106. As an extra step, the application 102 may check the loft and lie measurements for validity against a 3D model of the target golf club (i.e. with prescribed loft and lie measurements), within the database 482 of virtual objects.

In other words, the application 102 is configured to implement the modules and functionality of FIG. 4 such that the camera 106 and scene may be calibrated, the fiducials 108 may be positioned along the golf club 510, and images may be captured with the camera 106 of the fiducials 108 and the golf club 510. Referencing data defining features of the images associated with the fiducials 108B-108C, the position and rotation of these fiducials 108 can be reported to determine the center line shaft vector. In addition, referencing data defining features of the images associated with the fiducial 108A, the plane of the face 540 of the golf club 510 may be determined. The aforementioned equations may then be used to measure the loft and the lie of the golf club 510 based on the center line shaft vector and the plane of the face 540 of the golf club 510.

Figure 7:
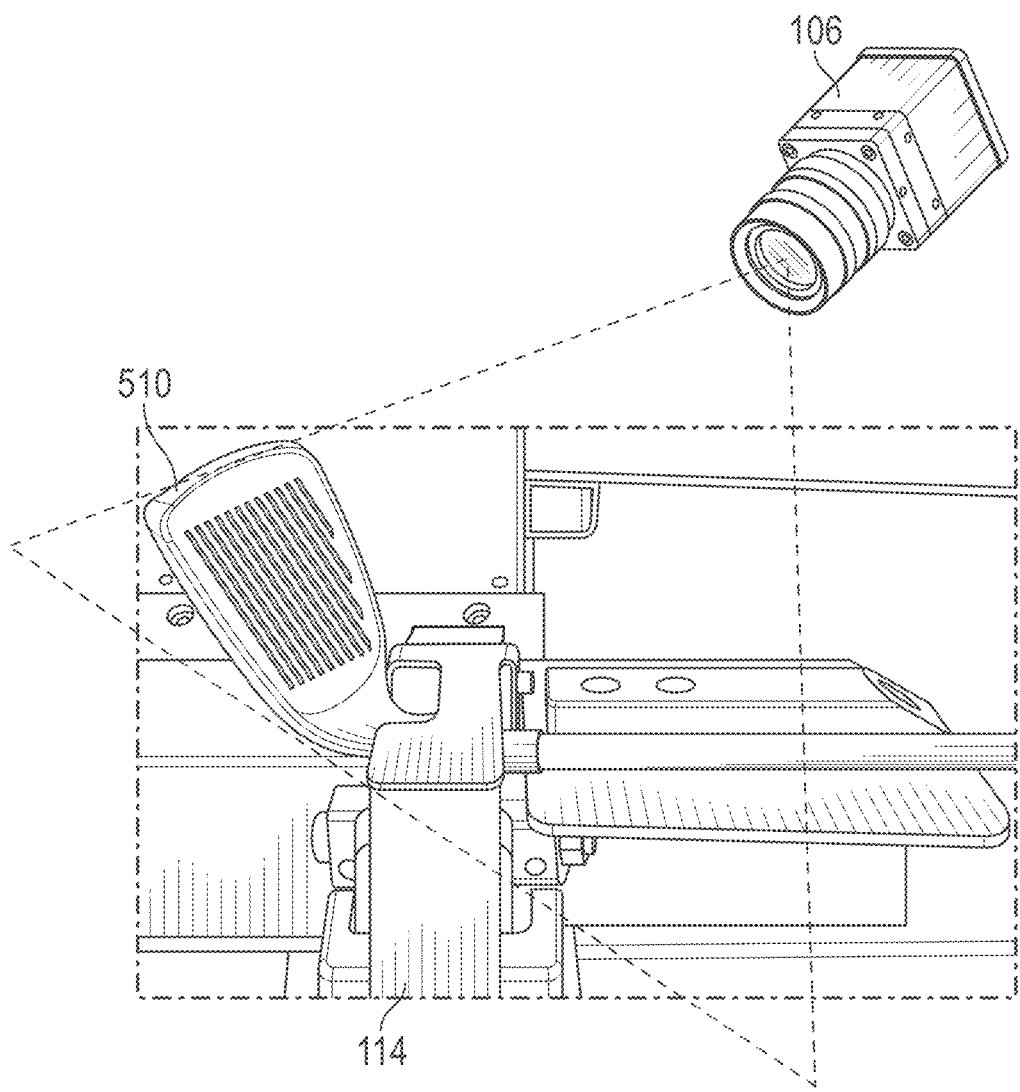
FIG. 7 is a side view of the golf club of FIG. 5B during measurement and analysis.

As shown in FIG. 7 in some embodiments, the golf club 510 being measured and adjusted may remain engaged to the adjustment tool 114 (e.g., pneumatic vice) throughout the adjustment process. The camera 106 may be positioned to provide the camera 106 with a clear line of sight (LOS) to the face and shaft 514 of the golf club 510 being adjusted.

Testing and Sample Results

Figure 8A:
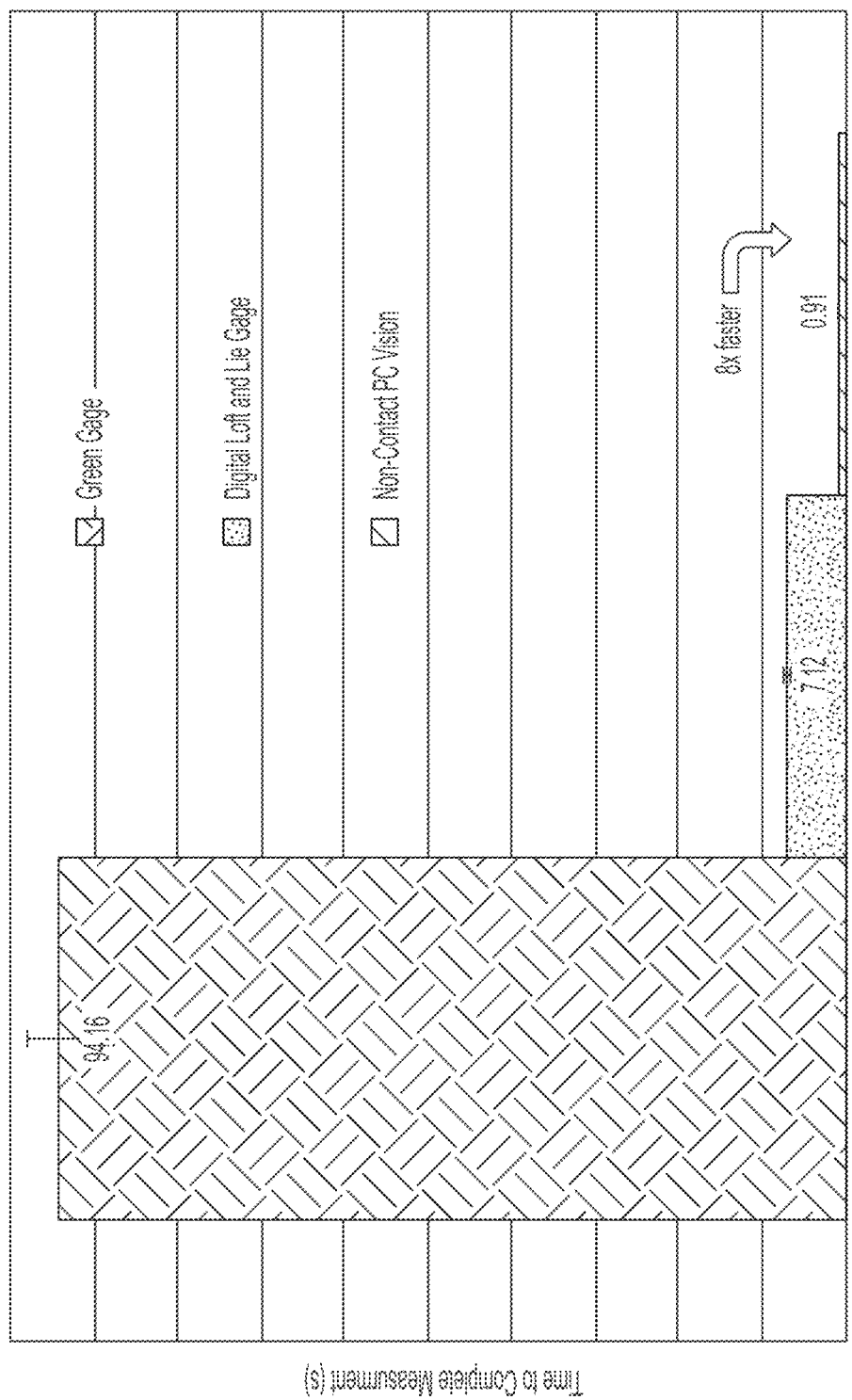
FIGS. 8A-8B are graphs illustrating testing data associated with the inventive concept described herein.
Figure 8B:
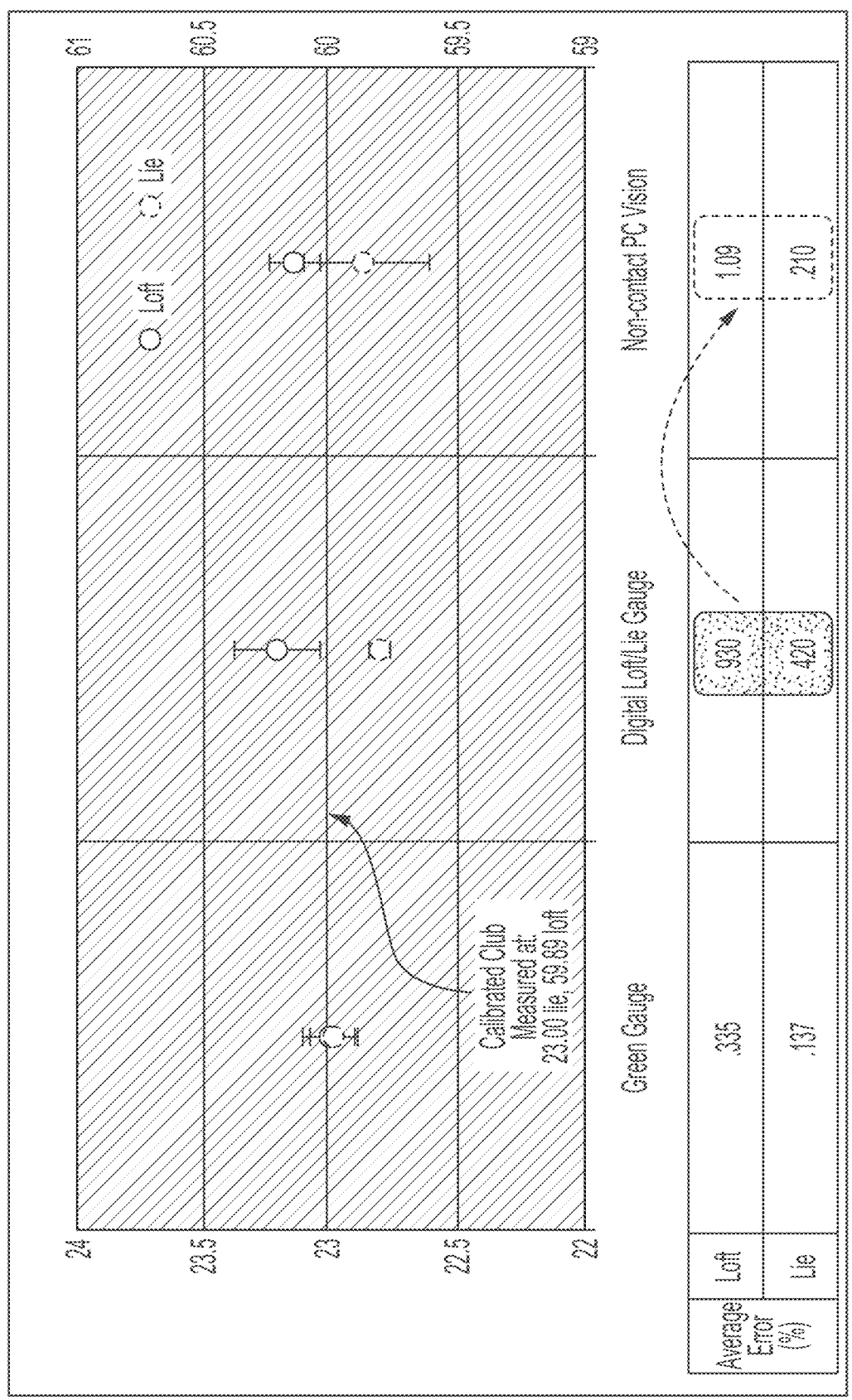

As indicated in FIGS. 8A-8B, utilizing the system 100, the application 102, and the features of FIG. 4 (indicated collectively as "Non-Contact PC Vision"), the time to measure loft and lie of the golf club 510 was found to be significantly reduced compared with other methods and systems, and the calculations result in a suitable error rate. System accuracies of better than 0.0004" (over a 4" vision volume) are possible with a typical angular accuracy better than 0.05°.

Importantly, the methods described herein accommodate the efficient measurement of loft and lie of the golf club 510 and can be accomplished without tools or fixturing. When utilizing the fixation tool 114, aspects of the system 100 may be implemented as a mobile app or computer program, to measure the attributes of the golf club 510 without removing the golf club 510 from the adjustment tool 114. The camera 106 can continuously or at intervals feed the application 102 with image data during scene calibration and measurement, without undesired removal and re-engagement of the golf club 510 to the adjustment tool 114.

In other embodiments, intrinsic features of the golf club 510 may be used for measurement and self-calibration (i.e. spacing of the grooves and diameters of the shaft 514 at the tip and grip of the golf club 510, not shown). In other embodiments, multiple camera/detectors using imaging techniques for high resolution point clouds or meshes may be implemented. All of these techniques may be utilized for both desktop and mobile implementations of the system 100 described herein.

Exemplary Computing Components

Figure 9:
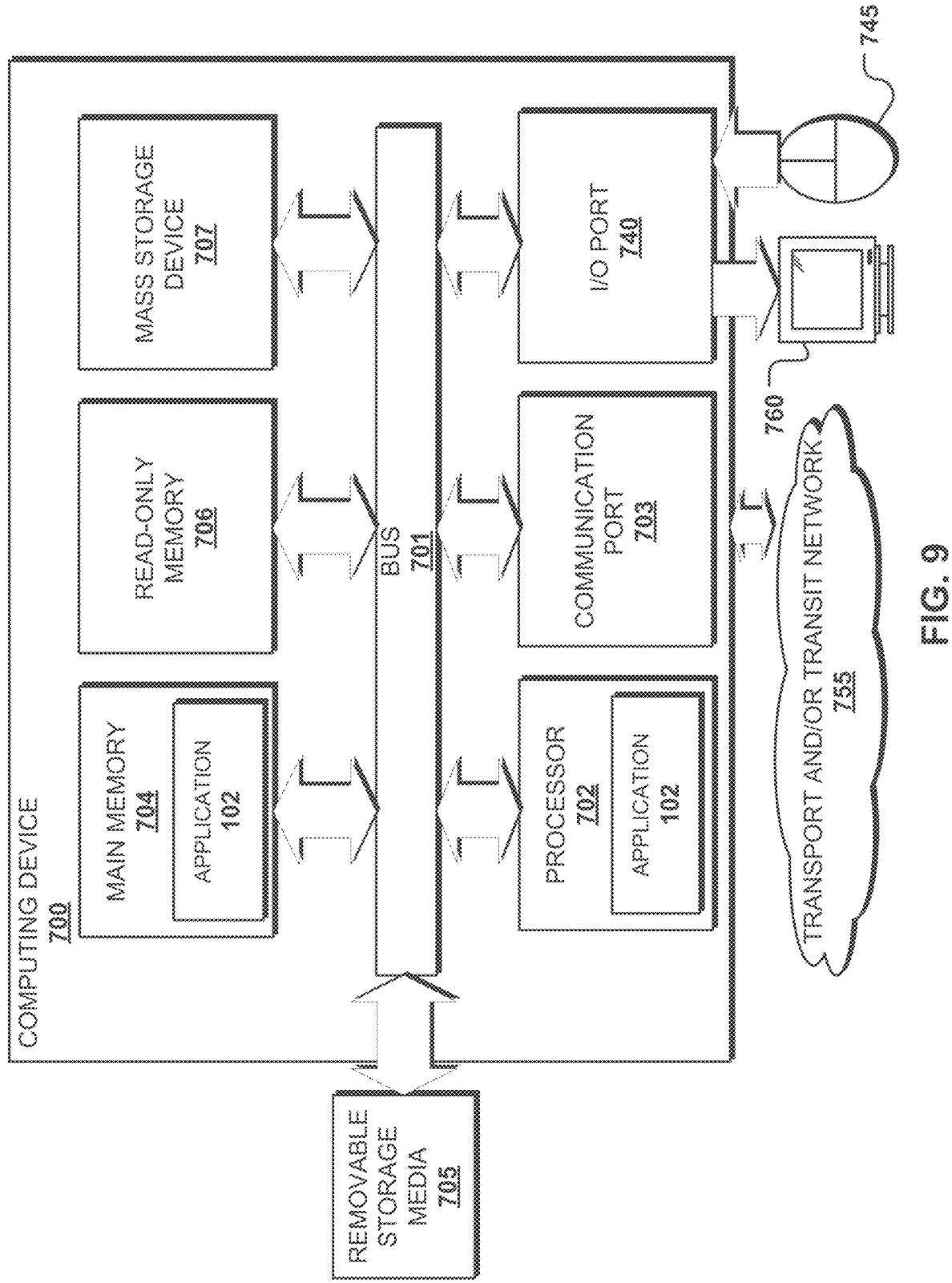
FIG. 9 is a simplified block diagram illustrating an example of a computing system that may implement various services, systems, and methods discussed herein.

FIG. 9 is an example schematic diagram of a computing device 700 that may implement various methodologies discussed herein. For example, the computing device 700 may include the computing device 104 executing or accessing functionality and/or aspects of the application 102. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may include dedicated circuitry that is permanently configured (e.g., as a special-purpose processor, such as a field-programmable gate array (FPGA) or an application-specific integrated circuit (ASIC)) to perform certain operations. A hardware-implemented module may also include programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

CLAUSES

Clause 1: A system for measuring attributes of a golf club, comprising: a camera configured to capture images of the golf club and a plurality of fiducials; and a computing device in operable communication with the camera, the computing device configured to: access a first set of pixels associated with each of the plurality of fiducials of a first image to calibrate a spatial resolution of the camera, access a second image from the camera, the second image including a golf club with the plurality of fiducials positioned along predetermined locations of the golf club, convert the second image to a second set of pixels associated with each of the plurality of fiducials, generate a set of points corresponding to the plurality of fiducials, the set of points defining estimated three-dimensional features of the plurality of fiducials in the second image based on comparisons between the first set of pixels and the second set of pixels, apply the set of points to a series of predetermined functions to generate club characteristics data defining a center axis of a shaft of the golf club, a plane parallel to a face of the golf club, and a normal vector to the plane, and output measurements including a loft angle and a lie angle associated with the golf club based upon the club characteristics data.

Clause 2: The system of clause 1, wherein the plurality of fiducials comprise discrete fiducials removable from the golf club.

Clause 3: The system of clause 2, wherein the discrete fiducials comprise a set of 2D quick response (QR) codes.

Clause 4: The system of clause 1, wherein the plurality or fiducials comprise natural preselected features of the golf club.

Clause 5: The system of clause 1, wherein calibration of the spatial resolution of the camera comprises: providing a sheet, the plurality of fiducials defined as an array along a side of the sheet, positioning the sheet in front of the camera such that the side of the sheet is oriented towards a lens of the camera, and changing a position and orientation of the sheet relative to the camera while capturing one or more images to generate calibration data, wherein the calibration data is utilized by the computing device to determine the set of points corresponding to the plurality of fiducials.

Clause 6: The system of clause 5, wherein the sheet is used as a reference to compute an initial pose of the camera.

Clause 7: The system of clause 1, wherein the second set of pixels are a portion of a pixel array defining an entirety of the second image, wherein the second set of pixels define positions and dimensions specific to the plurality of fiducials in the second image, and further define an array of integers.

Clause 8: The system of clause 1, wherein the computing device utilizes a recursive filter to generate the set of points based on a pose of the camera and the second set of pixels.

Clause 9: The system of clause 1, wherein a portion of the plurality of fiducials are assigned to the face of the golf club, and a second portion of the plurality of fiducials are assigned to the shaft of the golf club.

Clause 10: The system of clause 1, wherein the set of predetermined functions comprises: a series of one or predetermined linear algebraic operations comprising: a three dimensional (3D)| function, the 3D function including an input comprising a set of coordinates representing an origin of a local coordinate system and a second of coordinates representing a predetermined location along the golf club, the 3D function configured to generate an output comprising a third set of coordinates representing a vector of a shaft axis of the golf club; a first function which performs a cross product operation on a first function input, the first function input comprising a set of points defining a plane on a face of the golf club, the first function configured to generate a first function output defining a normal vector to the plane; a second function including a second function input that comprises a ratio of vectors, the second function configured to generate a second function output defining an angle representing a lie of the golf club; and a third function including a third function input that comprises a ratio of vectors, the third function configured to generate a third function output defining an angle representing a loft of the golf club.

Clause 11: A method, comprising: providing a processor in operable communication with a camera component, the processor configured for: accessing a first image from the camera component, the first image including a plurality of fiducials; converting the first image to a first plurality of picture elements associated with each of the plurality of fiducials; accessing a second image from the camera component, the second image including the plurality of fiducials positioned along predetermined locations of a golf club; converting the second image to a second plurality of picture elements associated with each of the plurality of fiducials; generating a set of points defining virtual three-dimensional aspects of the plurality of fiducials based on differences between the first and the second plurality of picture elements; applying the set of points as inputs to a series of predefined linear algebraic operations to generate golf club characteristics data; and generating output measurements defining a loft angle and a lie angle associated with the golf club based on the golf club characteristics data.

Clause 12: The method of clause 11, wherein the camera component comprises one or more cameras.

Clause 13: The method of clause 11, wherein the first plurality of picture elements and the second plurality of picture elements comprise pixels represented as a two-dimensional array of integers.

Clause 14: The method of clause 11, further comprising utilizing the camera component to continuously track the plurality of fiducials while the golf club is positioned within an image frame associated with the camera component.

Clause 15: The method of clause 11, further comprising: engaging the golf club to a pneumatic vice of an adjustment fixture to position the golf club within a clear line of sight of the camera component.

Clause 16: The method of clause 11, further comprising positioning the camera component in a predetermined location relative to the plurality of fiducials prior to a calibration step.

Clause 17: The method of clause 11, wherein the plurality of fiducials comprises features of the golf club including grooves, a logo, and a face of the golf club.

Clause 18: The method of clause 11, wherein a first fiducial and a second fiducial of the plurality of fiducials are defined along a bottom groove of the golf club and a third fiducial of the plurality of fiducials is defined along a face of the golf club.

Clause 19: An apparatus, comprising: a camera; and a computing device, the computing device configured to access a plurality of picture elements associated with a plurality of fiducials from a first image generated by the camera, identify a series of changes to the plurality of picture elements from a second image depicting the plurality of fiducials positioned along a golf club, generate a set of 3D points based on the series of changes to the plurality of picture elements associated with the plurality of fiducials, apply the 3D set of points as inputs to one or more predefined linear algebra operations to generate golf club characteristics data, and output measurements defining a loft angle and a lie angle associated with the golf club based on the golf club characteristics data.

Clause 20: The apparatus of clause 19, wherein the golf club characteristics data a center axis of a shaft of the golf club, a plane parallel to a face of the golf club, and a normal vector to the plane, and wherein the output measurements are checked against predetermined target specifications associated with the golf club.

Clause 21: The apparatus of clause 19, wherein the plurality of picture elements associated with the plurality of fiducials comprises pixels of a two-dimensional image, and the series of changes to the picture elements associated with the plurality of fiducials includes changes to the pixels reflected by the second image.

Clause 22: An apparatus, comprising: a camera; and a computing device, the computing device configured to access a plurality of two-dimensional image features associated with a plurality of fiducials from a first image generated by the camera, identify changes in position and rotation of the plurality of fiducials based on one or more changes to the plurality of two-dimensional picture features as observed via a second image depicting the plurality of fiducials positioned along a mechanical device, generate a set of 3D points based on the one or more changes to the plurality of two-dimensional picture features associated with the plurality of fiducials, apply the 3D set of points as inputs to one or more predefined linear algebraic operations to generate physical attributes data associated with the mechanical device, and output performance measurements associated with the mechanical device based on the physical attributes data.

Clause 23: The apparatus of clause 22, wherein the plurality of fiducials comprises discrete QR codes positioned along predetermined locations of the mechanical device.

Clause 24: The apparatus of clause 22, wherein the plurality of fiducials comprises natural or real features associated with predetermined locations of the mechanical device.

What is claimed is:

1. A system for measuring attributes of a golf club, consisting of:
    a single camera configured to capture images of the golf club and a plurality of fiducials; and
    a computing device in operable communication with the single camera, the computing device configured to:
        access a first set of pixels associated with each of the plurality of fiducials of a first image to calibrate a spatial resolution of the single camera,
        access a second image from the single camera, the second image including at least a head of the golf club with the plurality of fiducials positioned along predetermined locations of the golf club,
        convert the second image to a second set of pixels associated with each of the plurality of fiducials,
        generate a set of points corresponding to the plurality of fiducials, the set of points defining estimated three-dimensional features of the plurality of fiducials in the second image based on comparisons between the first set of pixels and the second set of pixels,
        apply the set of points to a series of predetermined functions to generate club characteristics data defining a center axis of a shaft of the golf club, a plane parallel to a face of the golf club, and a normal vector to the plane, and
        output measurements including a loft angle and a lie angle associated with the golf club based upon the club characteristics data;
        wherein a first fiducial of the plurality of fiducials is defined along a bottom groove of the golf club.

2. The system of claim 1, wherein the plurality of fiducials comprise at least one discrete fiducial that is removable from the golf club.

3. The system of claim 2, wherein the at least one discrete fiducial comprises a set of 2D quick response (QR) codes.

4. The system of claim 1, wherein all the fiducials of the plurality of fiducials comprise natural preselected features of the golf club.

5. The system of claim 1, wherein calibration of the spatial resolution of the single camera comprises:
    providing a sheet, the plurality of fiducials defined as an array along a side of the sheet,
    positioning the sheet in front of the single camera such that the side of the sheet is oriented towards a lens of the single camera, and
    changing a position and orientation of the sheet relative to the single camera while capturing one or more images to generate calibration data,
    wherein the calibration data is utilized by the computing device to determine the set of points corresponding to the plurality of fiducials.

6. The system of claim 5, wherein the sheet is used as a reference to compute an initial pose of the single camera.

7. The system of claim 1, wherein the second set of pixels are a portion of a pixel array defining an entirety of the second image, wherein the second set of pixels define positions and dimensions specific to the plurality of fiducials in the second image, and further define an array of integers.

8. The system of claim 1, wherein the computing device utilizes a recursive filter to generate the set of points based on a pose of the single camera and the second set of pixels.

9. The system of claim 1, wherein a portion of the plurality of fiducials are assigned to the face of the golf club, and a second portion of the plurality of fiducials are assigned to a hosel of the golf club.

10. The system of claim 1, wherein the series of predetermined functions comprises: a series of one or more predetermined linear algebraic operations comprising:
    a three dimensional (3D) function, the 3D function including an input comprising a set of coordinates representing an origin of a local coordinate system and a second set of coordinates representing a predetermined location along the golf club, the 3D function configured to generate an output comprising a third set of coordinates representing a vector of a shaft axis of the golf club;
    a first function which performs a cross product operation on a first function input, the first function input comprising a set of points defining the plane parallel to the face of the golf club, the first function configured to generate a first function output defining a normal vector to the plane;
    a second function including a second function input that comprises a ratio of vectors, the second function configured to generate a second function output defining an angle representing a lie of the golf club; and
    a third function including a third function input that comprises a ratio of vectors, the third function configured to generate a third function output defining an angle representing a loft of the golf club.

11. A method, comprising:
    providing a system consisting of a processor in operable communication with a single camera, the processor configured for:
        accessing a first image from the single camera, the first image including a plurality of fiducials;
        converting the first image to a first plurality of picture elements associated with each of the plurality of fiducials;
        accessing a second image from the single camera, the second image including the plurality of fiducials positioned along predetermined locations of a golf club;
        converting the second image to a second plurality of picture elements associated with each of the plurality of fiducials;
        generating a set of points defining virtual three-dimensional aspects of the plurality of fiducials based on differences between the first and the second plurality of picture elements;
        applying the set of points as inputs to a series of predefined linear algebraic operations to generate golf club characteristics data; and
        generating output measurements defining a loft angle and a lie angle associated with the golf club based on the golf club characteristics data;
        wherein a first fiducial of the plurality of fiducials is defined along a bottom groove of the golf club.

12. The method of claim 11, wherein the first plurality of picture elements and the second plurality of picture elements comprise pixels represented as a two-dimensional array of integers.

13. The method of claim 11, further comprising utilizing the single camera to continuously track the plurality of fiducials while the golf club is positioned within an image frame associated with the single camera.

14. The method of claim 11, further comprising:
engaging the golf club to a pneumatic vice of an adjustment fixture to position the golf club within a clear line of sight of the single camera.

15. The method of claim 11, further comprising positioning the single camera in a predetermined location relative to the plurality of fiducials prior to a calibration step.

16. The method of claim 11, wherein all the fiducials of the plurality of fiducials comprise natural preselected features of the golf club.

17. The method of claim 11, wherein a second fiducial of the plurality of fiducials is defined along a face of the golf club.

18. An apparatus, consisting of:
a single camera; and
a computing device, the computing device configured to access a plurality of picture elements associated with a plurality of fiducials from a first image generated by the single camera, identify a series of changes to the plurality of picture elements from a second image depicting the plurality of fiducials positioned along a head of a golf club, generate a set of 3D points based on the series of changes to the plurality of picture elements associated with the plurality of fiducials, apply the set of 3D points as inputs to one or more predefined linear algebra operations to generate golf club characteristics data, and output measurements defining a loft angle and a lie angle associated with the golf club based on the golf club characteristics data;
wherein a first fiducial of the plurality of fiducials is defined along a bottom groove of the golf club.

19. The apparatus of claim 18, wherein the golf club characteristics data defines a center axis of a shaft of the golf club, a plane parallel to a face of the golf club, and a normal vector to the plane, and wherein the output measurements are checked against predetermined target specifications associated with the golf club.

* * * * *